US009313262B2

(12) United States Patent
Takahashi et al.

(10) Patent No.: US 9,313,262 B2
(45) Date of Patent: Apr. 12, 2016

(54) INFORMATION SYSTEM, METHOD FOR DISPLAYING INFORMATION, INFORMATION PROCESSING APPARATUS, AND NON-TRANSITORY STORAGE MEDIUM ENCODED WITH COMPUTER READABLE PROGRAM

(71) Applicant: NINTENDO CO., LTD., Kyoto (JP)

(72) Inventors: Ryutaro Takahashi, Kyoto (JP); Yoshio Sakamoto, Kyoto (JP); Eisaku Nakae, Kyoto (JP); Masaki Wada, Kyoto (JP); Satoshi Komatsu, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 294 days.

(21) Appl. No.: 13/960,337

(22) Filed: Aug. 6, 2013

(65) Prior Publication Data

US 2014/0244709 A1 Aug. 28, 2014

(30) Foreign Application Priority Data

Feb. 27, 2013 (JP) ................................ 2013-037978

(51) Int. Cl.
*G06F 15/167* (2006.01)
*H04L 29/08* (2006.01)

(52) U.S. Cl.
CPC .................................... *H04L 67/10* (2013.01)

(58) Field of Classification Search
CPC ..... A63F 13/10; A63F 13/12; A63F 2300/66; A63F 2300/6607; G06F 19/3456
See application file for complete search history.

(56) References Cited

U.S. PATENT DOCUMENTS 8,971,809 B2 3/2015 Lee
2001/0034267 A1* 10/2001 Toyama et al. ................ 463/31
(Continued)

FOREIGN PATENT DOCUMENTS

JP 2011-309 1/2011
WO 2011/052980 5/2011

OTHER PUBLICATIONS

Search Report (5 pgs.) dated Mar. 24, 2014 issued in corresponding European Application No. 13182204.1.
(Continued)

*Primary Examiner* — Peling Shaw
(74) *Attorney, Agent, or Firm* — Nixon & Vanderhye, P.C.

(57) ABSTRACT

An exemplary embodiment provides an information system, including a plurality of information processing apparatuses, each information processing apparatus capable of communicating data with one another within a prescribed range, and a server capable of communicating data with each information processing apparatus. Each information processing apparatus includes a character information transmission and reception module for transmitting to and receiving from another information processing apparatus, character information having identification information identifying one or more information processing apparatuses and parameter information which can be changed, a parameter change module for changing parameter information in the received character information, a server transmission module for transmitting the changed character information to the server, a server reception module for receiving character information corresponding to identification information of each information processing apparatus itself from the server, and a display control module for performing display processing based on parameter information in the character information received from the server.

17 Claims, 17 Drawing Sheets

(56) References Cited

U.S. PATENT DOCUMENTS

| | | | | |
|---|---|---|---|---|
| 2002/0173350 | A1* | 11/2002 | Kaneda | 463/3 |
| 2004/0203363 | A1 | 10/2004 | Carlton et al. | |
| 2006/0252548 | A1 | 11/2006 | Sasaki et al. | |
| 2007/0061201 | A1* | 3/2007 | Ellis et al. | 705/14 |
| 2009/0007186 | A1* | 1/2009 | Hartwell | 725/62 |
| 2010/0085480 | A1 | 4/2010 | Katakame | |
| 2010/0182240 | A1 | 7/2010 | Ji et al. | |
| 2010/0192176 | A1* | 7/2010 | Beppu et al. | 725/34 |
| 2010/0325235 | A1 | 12/2010 | Konno et al. | |
| 2011/0105093 | A1* | 5/2011 | Chang et al. | 455/414.1 |
| 2011/0276911 | A1 | 11/2011 | Choi | |
| 2012/0054297 | A1* | 3/2012 | Konno et al. | 709/214 |
| 2012/0069169 | A1 | 3/2012 | Dejima | |
| 2012/0221189 | A1 | 8/2012 | Konet et al. | |
| 2013/0027289 | A1 | 1/2013 | Choi et al. | |
| 2013/0281123 | A1 | 10/2013 | Kuawahara | |
| 2014/0280542 | A1 | 9/2014 | Pridmore et al. | |

OTHER PUBLICATIONS

U.S. Appl. No. 14/013,461, filed Aug. 29, 2013.

U.S. Appl. No. 14/013,606, filed Aug. 29, 2013.

U.S. Patent and Trademark Office, "Non-Final Office Action," issued in connection with U.S. Appl. No. 14/013,461, dated Oct. 14, 2015 (7 pages).

U.S. Patent and Trademark Office, "Non-Final Office Action," issued in connection with U.S. Appl. No. 14/013,606, dated Oct. 9, 2015 (8 pages).

* cited by examiner

FIG.7

| | | |
|---|---|---|
| D10 | CHARACTER CODE | |
| | NAME OF ISLAND WHERE ONE LEFT | |
| | THE NUMBER OF TIMES OF MOVEMENT | |
| | TERMINAL ID | |
| | EXPERIENCE PARAMETER | |
| D20A | ADDITIONAL INFORMATION | ISLAND NAME |
| | | SOUVENIR DATA |
| | | FLAG FOR PRESENTATION |
| | | DATA FOR PRESENTATION |
| D20B | ADDITIONAL INFORMATION | ISLAND NAME |
| | | SOUVENIR DATA |
| | | FLAG FOR PRESENTATION |
| | | DATA FOR PRESENTATION |
| ⋮ | ⋮ | ⋮ |

FIG.8

| | |
|---|---|
| CHARACTER CODE | CR0101 |
| NAME OF ISLAND WHERE ONE LEFT | ISLAND (0) |
| THE NUMBER OF TIMES OF MOVEMENT | 0 |
| TERMINAL ID | TA0123 |
| EXPERIENCE PARAMETER | 0 |

FIG.9

| | | |
|---|---|---|
| CHARACTER CODE | | CR0101 |
| NAME OF ISLAND WHERE ONE LEFT | | ISLAND (0) |
| THE NUMBER OF TIMES OF MOVEMENT | | 1 |
| TERMINAL ID | | TA0123 |
| EXPERIENCE PARAMETER | | 0 |
| ADDITIONAL INFORMATION | ISLAND NAME | ISLAND (1) |
| | SOUVENIR DATA | P |
| | FLAG FOR PRESENTATION | NULL |
| | DATA FOR PRESENTATION | NULL |

FIG.10

| | | |
|---|---|---|
| CHARACTER CODE | | CR0101 |
| NAME OF ISLAND WHERE ONE LEFT | | ISLAND(0) |
| THE NUMBER OF TIMES OF MOVEMENT | | 1 |
| TERMINAL ID | | TA0123 |
| EXPERIENCE PARAMETER | | 12 |
| ADDITIONAL INFORMATION | ISLAND NAME | ISLAND(1) |
| | SOUVENIR DATA | P |
| | FLAG FOR PRESENTATION | NULL |
| | DATA FOR PRESENTATION | NULL |

FIG.11

| | | |
|---|---|---|
| CHARACTER CODE | | CR0101 |
| NAME OF ISLAND WHERE ONE LEFT | | ISLAND(0) |
| THE NUMBER OF TIMES OF MOVEMENT | | 1 |
| TERMINAL ID | | TA0123 |
| EXPERIENCE PARAMETER | | 12 |
| ADDITIONAL INFORMATION | ISLAND NAME | ISLAND(1) |
| | SOUVENIR DATA | P |
| | FLAG FOR PRESENTATION | 1 |
| | DATA FOR PRESENTATION | CR0121 |

FIG.12

| | | |
|---|---|---|
| CHARACTER CODE | | CR0101 |
| NAME OF ISLAND WHERE ONE LEFT | | ISLAND(0) |
| THE NUMBER OF TIMES OF MOVEMENT | | 1 |
| TERMINAL ID | | TA0123 |
| EXPERIENCE PARAMETER | | 12 |
| ADDITIONAL INFORMATION | ISLAND NAME | ISLAND(1) |
| | SOUVENIR DATA | P |
| | FLAG FOR PRESENTATION | 1 |
| | DATA FOR PRESENTATION | CR0121 |
| ADDITIONAL INFORMATION | ISLAND NAME | ISLAND(2) |
| | SOUVENIR DATA | N |
| | FLAG FOR PRESENTATION | NULL |
| | DATA FOR PRESENTATION | NULL |

FIG.13

| | | |
|---|---|---|
| CHARACTER CODE | | CR0101 |
| NAME OF ISLAND WHERE ONE LEFT | | ISLAND(0) |
| THE NUMBER OF TIMES OF MOVEMENT | | 1 |
| TERMINAL ID | | TA0123 |
| EXPERIENCE PARAMETER | | 20 |
| ADDITIONAL INFORMATION | ISLAND NAME | ISLAND(1) |
| | SOUVENIR DATA | P |
| | FLAG FOR PRESENTATION | 1 |
| | DATA FOR PRESENTATION | CR0121 |
| ADDITIONAL INFORMATION | ISLAND NAME | ISLAND(2) |
| | SOUVENIR DATA | N |
| | FLAG FOR PRESENTATION | NULL |
| | DATA FOR PRESENTATION | NULL |

INFORMATION SYSTEM, METHOD FOR DISPLAYING INFORMATION, INFORMATION PROCESSING APPARATUS, AND NON-TRANSITORY STORAGE MEDIUM ENCODED WITH COMPUTER READABLE PROGRAM

This nonprovisional application is based on Japanese Patent Application No. 2013-37978 filed with the Japan Patent Office on Feb. 27, 2013, the entire contents of which are hereby incorporated by reference.

FIELD

The technology herein generally relates to an information system, a method for displaying information, an information processing apparatus, and a non-transitory storage medium encoded with a computer readable program, and particularly to an information system and the like including a server and two or more information processing apparatuses and being capable of communicating data with an information processing apparatus and the server.

BACKGROUND AND SUMMARY

A system capable of providing data which can be made use of by an application to other information processing apparatuses by using near field communication has conventionally been known.

In the system above, in a case where data is communicated with a communication counterpart through near field communication and data is transmitted to another information processing apparatus, there has been no opportunity to further make use of the data transmitted to the communication counterpart.

Exemplary embodiments provide an information system, a method for displaying information, an information processing apparatus, and a non-transitory storage medium encoded with a computer readable program, capable of enhancing zest of data communication.

An exemplary embodiment provides an information system including a plurality of information processing apparatuses. Each information processing apparatus is capable of communicating data with one another within a prescribed range and the information system further includes a server capable of communicating data with each information processing apparatus. Each information processing apparatus includes a character information transmission and reception module for transmitting to and receiving from another information processing apparatus, character information having identification information identifying one or more information processing apparatuses and parameter information which can be changed, a parameter change module for changing parameter information in the received character information, a server transmission module for transmitting the changed character information to the server, a server reception module for receiving character information corresponding to identification information of each information processing apparatus itself from the server, and a display control module for performing display processing based on the parameter information in the character information received from the server.

In an exemplary embodiment, the character information transmission and reception module is configured to transmit at least one of first character information having the identification information of each information processing apparatus itself and second character information having received identification information of another apparatus to another information processing apparatus.

In an exemplary embodiment, each information processing apparatus is further configured to include a character information generation module for generating character information having parameter information which can be changed and identification information of each information processing apparatus itself.

In an exemplary embodiment, the parameter information has record information showing progress records of an apparatus having received the parameter information, and the parameter change module changes progress records of record information of the received character information.

In an exemplary embodiment, each information processing apparatus further includes an its own record display module for displaying record information included in the character information received from the server.

In an exemplary embodiment, each information processing apparatus further includes another record display module for displaying record information included in the character information exchanged between the apparatuses.

In an exemplary embodiment, each information processing apparatus further includes an additional information generation module for generating as additional information, display identification information associated with display processing based on the parameter information in another apparatus.

In an exemplary embodiment, the display control module performs display processing in accordance with the additional information included in the parameter information in the character information received from the server.

In an exemplary embodiment, the parameter change module changes the parameter information in the character information exchanged between the apparatuses in response to a user's operation.

In an exemplary embodiment, the parameter change module changes the parameter information in the received character information, in response to reception between the apparatuses.

In an exemplary embodiment, the parameter information has record information showing progress records of an apparatus having received the parameter information, and the display control module performs display processing in a manner based on the record information included in the received character information.

In an exemplary embodiment, the display control module performs display processing making use of a character object generated based on the parameter information in the character information received from the server.

In an exemplary embodiment, the display control module performs one of a plurality of types of display processing making use of the character object when a prescribed condition is satisfied.

In an exemplary embodiment, the display control module performs display processing for showing that the character object has returned to each information processing apparatus itself when the prescribed condition is satisfied.

An exemplary embodiment provides a method for displaying information in an information system including a plurality of information processing apparatuses. Each information processing apparatus is capable of communicating data with one another within a prescribed range and exchanging character information. The information system further includes a server capable of communicating data with each information processing apparatus. The character information has identification information identifying one or more information processing apparatuses and the parameter information being able to be changed. The method includes receiving, by the information processing apparatus, the character information and the parameter information from another information processing apparatus, changing, by another information processing apparatus, the parameter information in the character information exchanged between the apparatuses, transmitting, by another information processing apparatus, the changed character information to the server, receiving, by the information processing apparatus, character information corresponding to identification information identifying each information processing apparatus itself from the server, and performing, by the information processing apparatus, display processing for displaying information based on the parameter information in the character information received from the server.

An exemplary embodiment provides an information processing apparatus capable of communicating data with another information processing apparatus within a prescribed range and capable of communicating data with a server. The information processing apparatus includes a character information transmission and reception module for transmitting to and receiving from another information processing apparatus, character information having identification information identifying one or more information processing apparatuses and parameter information which can be changed, a parameter change module for changing parameter information in the received character information, a server transmission module for transmitting the changed character information to the server, a server reception module for receiving character information corresponding to identification information identifying each information processing apparatus itself from the server, and a display control module for performing display processing based on the parameter information in the character information received from the server.

An exemplary embodiment provides a non-transitory storage medium encoded with a computer readable program and executable by a computer, and the computer is provided in an information processing apparatus capable of communicating data with another information processing apparatus present within a prescribed range and capable of communicating data with a server. The program causes the computer to perform the steps of transmitting to and receiving from another information processing apparatus, character information having identification information and parameter information which can be changed, receiving character information transmitted from another information processing apparatus to the server and having changed parameter information corresponding to identification information of each information processing apparatus itself from the server, and performing display processing for displaying information based on the parameter information in the character information received from the server.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 7 shows an exemplary illustrative non-limiting diagram for illustrating a configuration of character information according to an exemplary embodiment.

FIGS. 8 to 13 each show exemplary illustrative non-limiting character information according to an exemplary embodiment.

DETAILED DESCRIPTION OF NON-LIMITING EXAMPLE EMBODIMENTS

Figure 1:
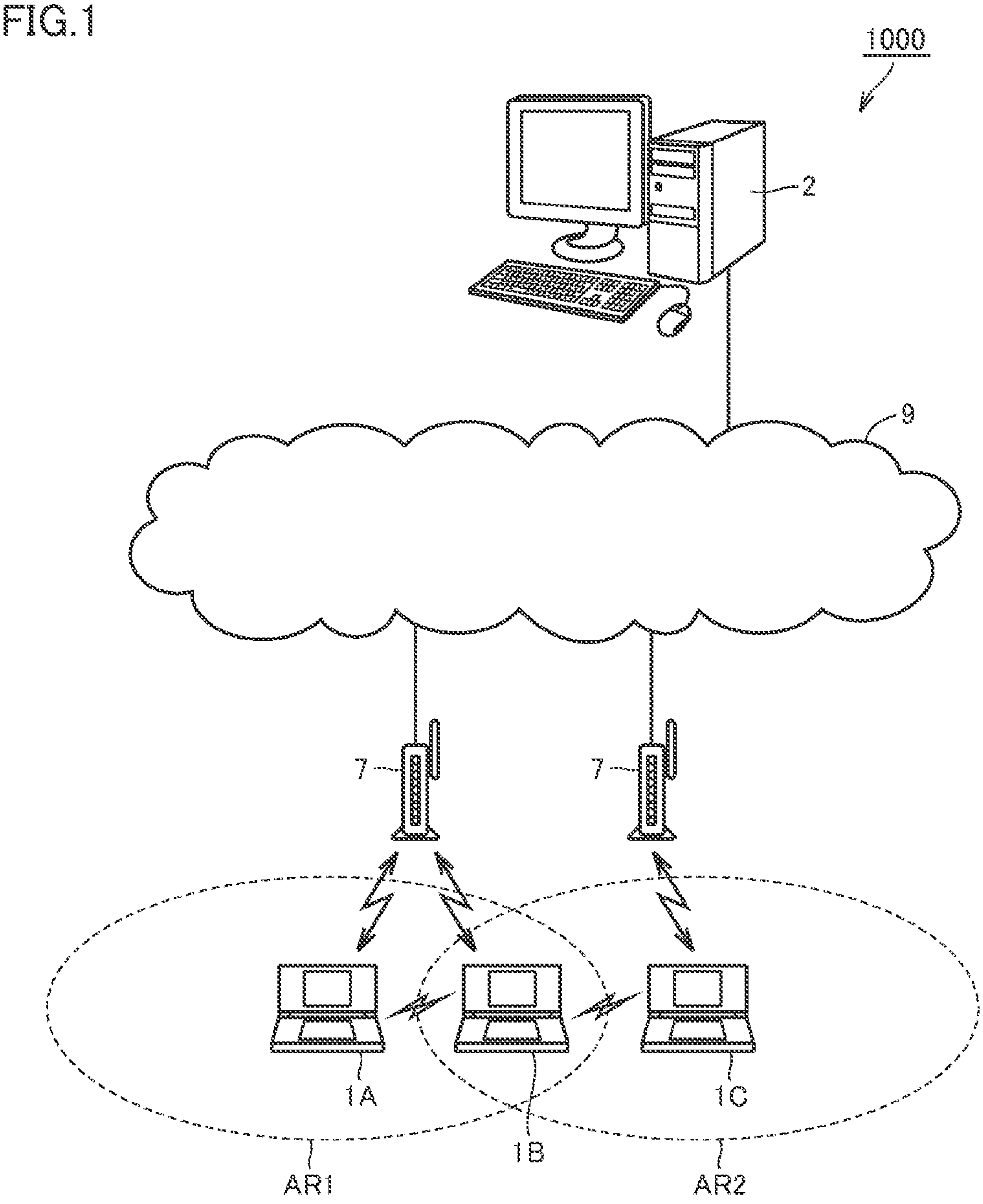
FIG. 1 shows an exemplary illustrative non-limiting configuration of an information system according to an exemplary embodiment.

An embodiment of an information system will be described hereinafter with reference to the drawings. In the description below, parts having the same function and action have the same reference characters allotted throughout the figures and redundant description will not be repeated.

[Configuration of Information System]

An information system 1000 including information processing apparatuses 1A to 1C and a server 2 will be described below as one embodiment. Information processing apparatuses 1A to 1C are by way of example of an information processing apparatus and each of them can communicate with server 2. When characteristics common to these are mentioned herein, they may also collectively be referred to as an "information processing apparatus 1." For an information processing apparatus belonging to the information system according to the present embodiment, a portable telephone, a smart phone (a high-function portable telephone), a television set incorporating an information processing function, a portable information processing apparatus, a stationary information processing apparatus, and the like can be adopted.

FIG. 1 is a diagram schematically showing a configuration of information system 1000 according to one embodiment. In information system 1000 shown in FIG. 1, information processing apparatus 1 can access server 2 through a network 9. Network 9 is represented, for example, by a wide area network (WAN) such as the Internet and a dedicated circuit, however, it is not limited thereto. More specifically, information processing apparatus 1 has a wireless communication function as will be described later, and it exchanges data with server 2 through an access point 7 electrically connected to network 9. Communication between information processing apparatus 1 and server 2 may be wired communication.

In the present embodiment, a communication manner in which information processing apparatus 1 communicates with server 2 through network 9 is referred to as "Internet communication". In addition, a communication manner in which information processing apparatuses 1 carry out direct wireless communication with each other without passing through network 9 is referred to as "local communication".

[Hardware Configuration of Information Processing Apparatus]

Figure 2:
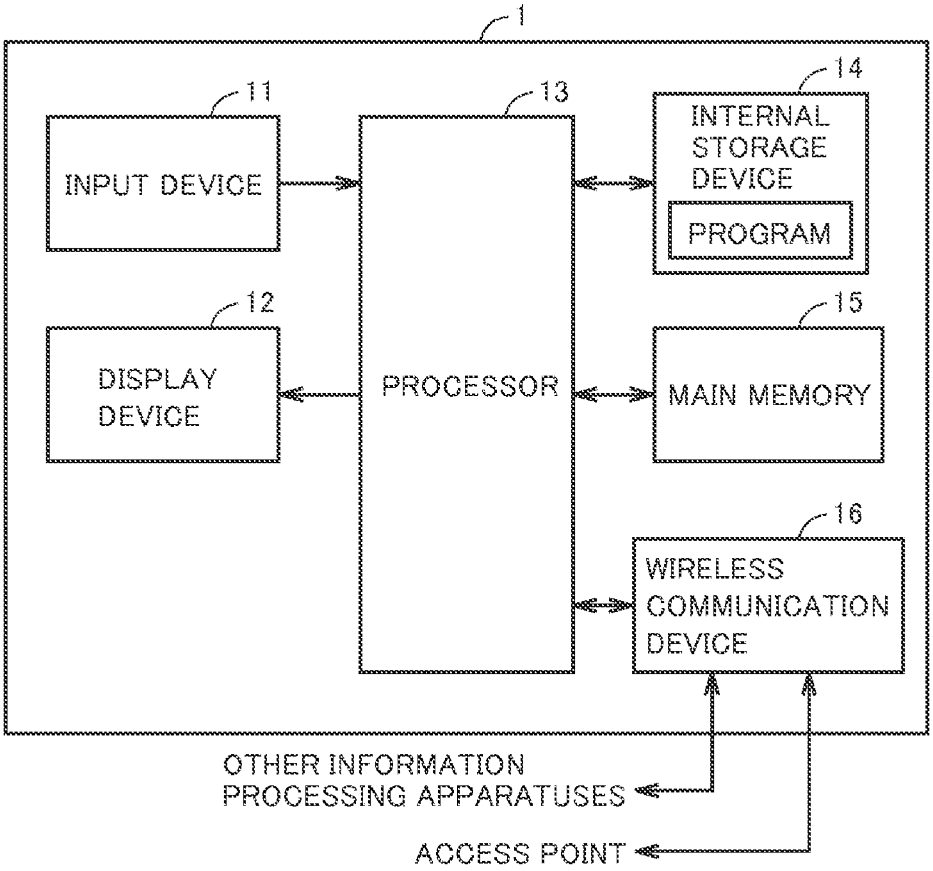
FIG. 2 shows an exemplary illustrative non-limiting configuration of hardware of an information processing apparatus according to an exemplary embodiment.

FIG. 2 is a block diagram of hardware of information processing apparatus 1 according to the present embodiment. As shown in FIG. 2, information processing apparatus 1 includes an input device 11, a display device 12, a processor 13, an internal storage device 14, a main memory 15, and a wireless communication device (wireless communication module) 16.

Input device 11 is operated by a user of information processing apparatus 1 and outputs to processor 13, a signal in response to a user's operation. Input device 11 is implemented, for example, by a cross-shaped switch, a push button, or a touch panel. Display device 12 displays an image on a screen. A displayed image includes, for example, at least one of an image generated in information processing apparatus 1 and an image transmitted from an external apparatus to information processing apparatus 1. Display device 12 includes such a known display device as a liquid crystal display device (LCD).

Processor 13 is operation processing means for executing a computer program.

Internal storage device 14 stores a computer program to be executed by processor 13. Internal storage device 14 also stores character information which will be described later. Internal storage device 14 is implemented, by way of example, by a NAND-type flash memory. A program to be executed by processor 13 may be stored in internal storage device 14 (from the time point of shipment or after shipment through communication with another piece of equipment) or may be stored in a recording medium attachable to and removable from a main body of information processing apparatus 1 (such as a universal serial bus (USB) memory).

Main memory 15 temporarily stores various types of data. Main memory 15 is implemented, by way of example, by a pseudo-SRAM (Static Random Access Memory) (PSRAM).

Wireless communication device 16 functions as an interface for communication with another information processing apparatus 1 through wireless communication. In addition, wireless communication device 16 also functions as an interface for communication with server 2 through access point 7.

[Hardware Configuration of Server]

Figure 3:
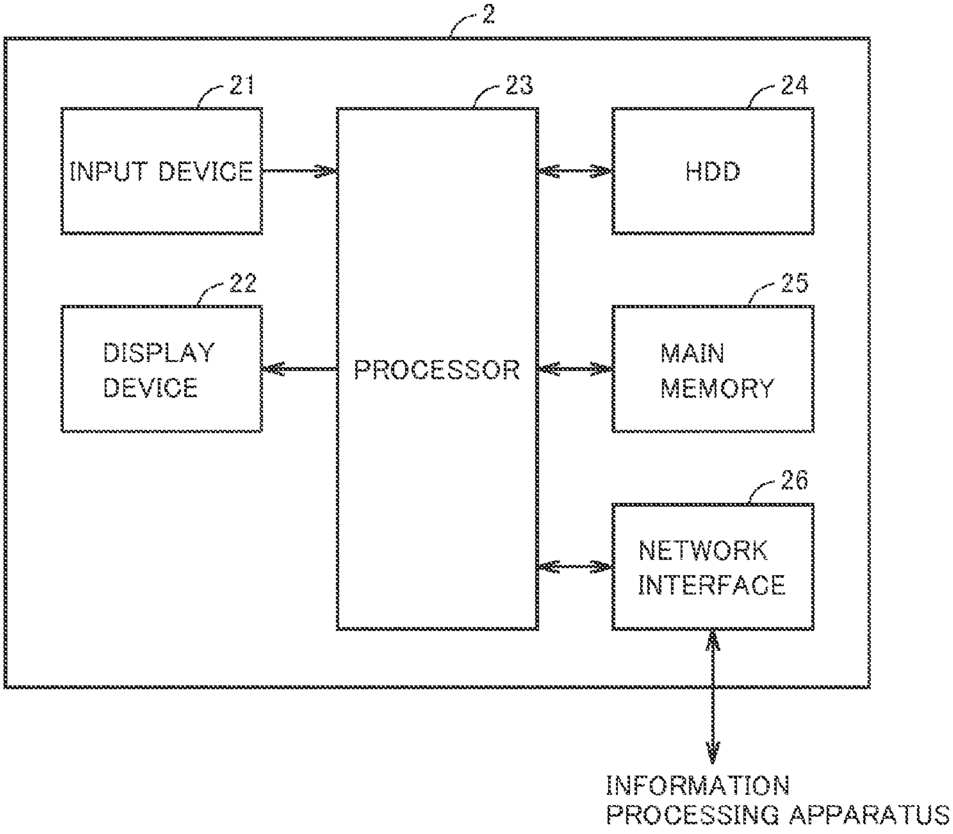
FIG. 3 shows an exemplary illustrative non-limiting configuration of hardware of a server according to an exemplary embodiment.

FIG. 3 is a block diagram of hardware of server 2. As shown in FIG. 3, server 2 includes an input device 21, a display device 22, a processor 23, a hard disk drive (HDD) 24, a main memory 25, and a network interface 26.

Input device 21 is operated by a user of server 2 and outputs to processor 23, a signal in response to a user's operation. Input device 21 is implemented, for example, by a keyboard or a mouse. Display device 22 displays an image on a screen and it is implemented, for example, by a liquid crystal display device (LCD).

Processor 23 is operation processing means for executing a computer program. HDD 24 stores a computer program to be executed by processor 23. The computer program includes a program for causing server 2 to function as a server apparatus.

Main memory 25 temporarily stores a computer program or information. Main memory 25 is implemented, by way of example, by a PSRAM. Network interface 26 also functions as an interface for communication with information processing apparatus 1. Network interface 26 is implemented, for example, by a LAN card.

[Internet Communication]

"Internet communication" which is a manner of communication between information processing apparatus 1 and server 2 will be described. In the "Internet communication", information processing apparatus 1 connects to access point 7 under a scheme complying, for example, with IEEE 802.11 and connects to network 9 through access point 7. Information processing apparatus 1 communicates with server 2 through network 9.

Processing for executing a task is exemplified as one example of processing for information processing apparatus 1 to communicate with server 2 through network 9. The task in the present embodiment refers to processing involving transmission and reception of prescribed data. More specifically, the task is categorized into two types of a "transmission task" and a "reception task" and they may also simply collectively be referred to as a "task" herein. Data indicating contents of the task includes information specifying a connection destination such as a URL of a server.

[Local Communication]

"Local communication" which is a manner of communication between information processing apparatuses 1 will be described. In the present embodiment, information processing apparatus 1 can exchange data for application which can be made use of by a prescribed application program (such as a game application) through "local communication". "Local communication" refers to such communication that prescribed data ("character information" in the present embodiment) stored in internal storage device 14 is transmitted automatically (without a user's operation) to another information processing apparatus 1 present at a short distance and data for exchange stored in internal storage device 14 of another information processing apparatus 1 is received automatically (without a user's operation) from another information processing apparatus 1. It is noted that local communication is also referred to as passing communication in the present example.

More specifically, local communication is carried out by cooperation of processor 13, wireless communication device 16, and the like in information processing apparatus 1. This processing is processing performed as background processing, for example, while information processing apparatus 1 is in what is called a sleep state (which may also be referred to as a stand-by state). For example, during sleep, such control that wireless communication device 16 basically mainly operates and sleep of processor 13 is temporarily canceled as necessary so that processor 13 temporarily mainly operates is carried out (for example, processing for searching for another information processing apparatus 1 is performed by wireless communication device 16 and transmission and reception of data is carried out by processor 13). In addition, for example, information processing apparatus 1 may include, separately from processor 13, a second processor operable with low power consumption, and during sleep, the second processor may mainly operate. Moreover, local communication may be carried out as appropriate in response to a user's instruction operation or the like even when information processing apparatus 1 is not in a sleep state.

In local communication, for example, information processing apparatus 1 repeatedly searches for another unspecified information processing apparatus 1 present within coverage of near field communication. Then, information processing apparatus 1 automatically transmits character information to another information processing apparatus 1 which was found as a result of search, and automatically receives character information stored in internal storage device 14 of another information processing apparatus from that another information processing apparatus.

"Local communication" above is carried out, for example, at the time when users each carrying information processing apparatus 1 pass each other. The character information is generated prior to "local communication" based on a user's operation or the like and stored in advance in a prescribed area of internal storage device 14.

FIG. 1 shows an area AR1 and an area AR2 as an example of coverage of near field communication. Area AR1 shows coverage of near field communication of information processing apparatus 1A. Area AR2 shows coverage of near field communication of information processing apparatus 1C.

For example, when moving information processing apparatus 1B is located within area AR1, information processing apparatus 1A and information processing apparatus 1B carry out local communication. Thus, for example, character information is transferred from information processing apparatus 1A to information processing apparatus 1B. In addition, when area AR2 has moved to a position where information processing apparatus 1B is included owing to movement of information processing apparatus 1C, information processing apparatus 1B and information processing apparatus 1C carry out local communication. Thus, for example, the character information transferred from information processing apparatus 1A to information processing apparatus 1B is transferred from information processing apparatus 1B to information processing apparatus 1C.

[Outlines of Processing of Application]

Outlines of processing of an application making use of character information transferred among a plurality of information processing apparatuses 1 will now be described with reference to FIGS. 4 and 5. In the present embodiment, outlines of processing of a "game application" representing one example of an application using character information will be described.

Figure 4:
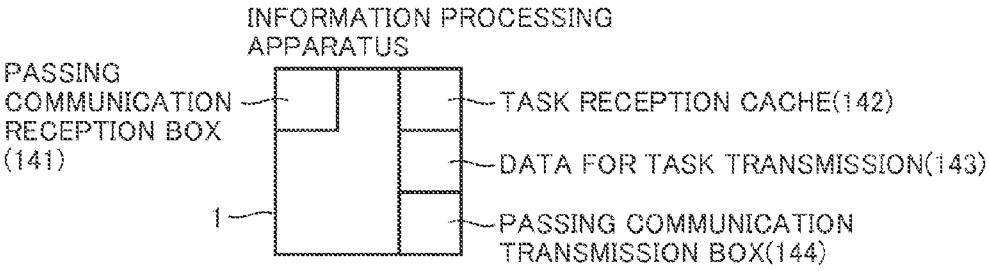
FIG. 4 shows exemplary illustrative non-limiting storage contents in a part of a storage area within the information processing apparatus according to an exemplary embodiment.

FIG. 4 is a diagram schematically showing storage contents in a part of a storage area within information processing apparatus 1. The storage area is provided, for example, within internal storage device 14. FIG. 5 is a diagram showing outlines of processing of a game application relating to the present embodiment.

Referring first to FIG. 4, in the storage area within information processing apparatus 1, a reception box for passing communication 141, a task reception cache 142, an area for storing data for task transmission (hereinafter referred to as "data for task transmission") 143, and a transmission box for passing communication 144 are provided. FIG. 4 shows a quadrangle representing a storage area within information processing apparatus 1, shows reception box for passing communication 141 in the upper left of the quadrangle, and shows task reception cache 142, data for task transmission 143, and transmission box for passing communication 144 as aligned vertically in a descending order in a right portion of the quadrangle. Transmission box for passing communication 144 is a memory area in which data to be transmitted during passing communication is stored. Reception box for passing communication 141 is a memory area in which data received during passing communication is stored.

On the premise that information processing apparatus 1 has a memory structure as shown in FIG. 4, outlines of processing of a game application relating to the present embodiment will be described with reference to FIG. 5. FIG. 5 shows an information processing apparatus A to an information processing apparatus C, which correspond to information processing apparatus 1A to information processing apparatus 1C in FIG. 1, respectively. It is assumed that a game application is installed in each of information processing apparatus A to C. FIG. 5 further shows server 2. In a game application according to the present embodiment, for example, "character information" generated in information processing apparatus A is successively transferred to other information processing apparatuses (information processing apparatuses B, C) through passing communication. Thus, such a presentation that a character expressed by character information sequentially travels information processing apparatuses A, B, C can be realized. Thus, zest of the game application can be enhanced.

The "character information" in the present embodiment includes at least identification information (a terminal ID) for identifying information processing apparatus 1 in which the character information has been generated and information representing characteristics for each character (parameter information). The "character information" may include information representing the number of times of transmission (transfer) (the number of times of movement). The character information may be generated by the game application or by another application.

Figure 5:
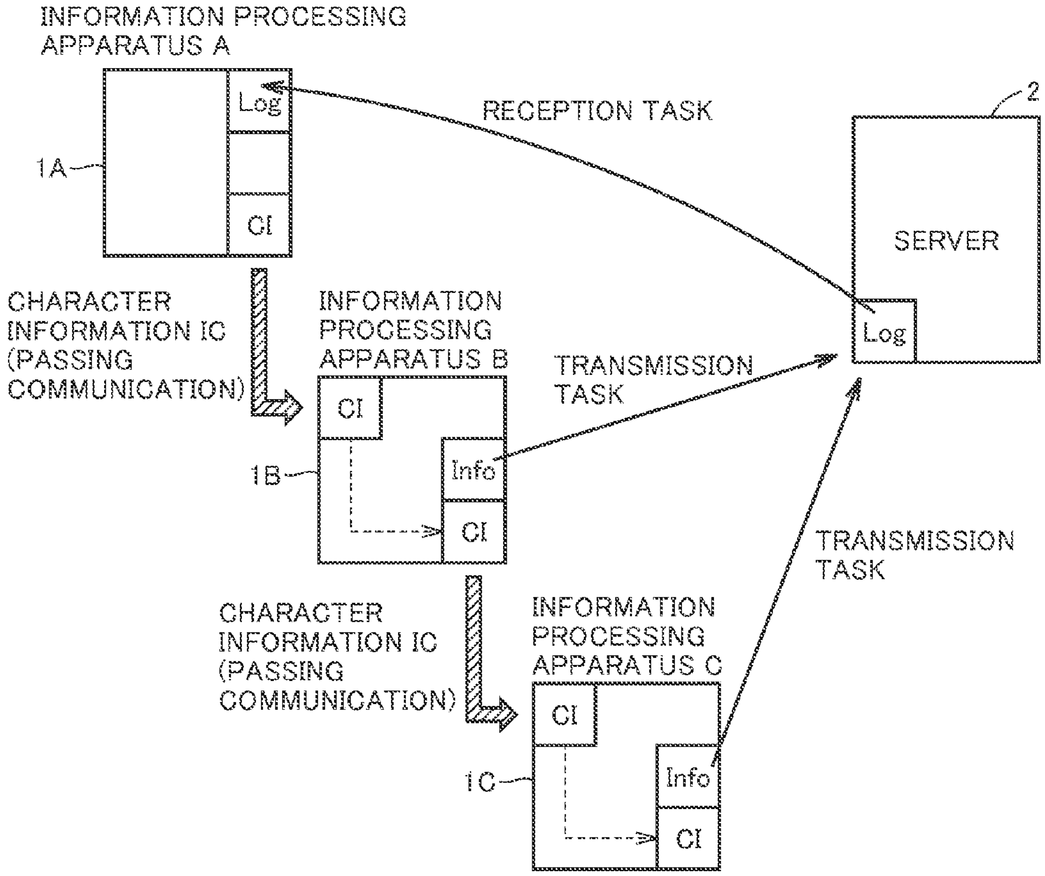
FIG. 5 shows exemplary illustrative non-limiting outlines of processing of a game application according to an exemplary embodiment.

In FIG. 5, initially, character information ("CI" in FIG. 5) is generated in information processing apparatus A and stored in transmission box for passing communication 144. Thereafter, as passing communication is carried out, the character information moves from information processing apparatus A to information processing apparatus B. Thus, the character information is moved to reception box for passing communication 141 of information processing apparatus B.

Thereafter, when the game application is executed in information processing apparatus B, the character information is moved within information processing apparatus B, from reception box for passing communication 141 to an area where processing data of the game application is to be stored (hereinafter referred to as a "work area"). During movement, when the "character information" includes "the number of times of movement," information processing apparatus B updates the character information such that a prescribed value is added to "the number of times of movement." Namely, information processing apparatus 1B updates by increment, "the number of times of movement," as the character information is received.

Information processing apparatus B can further update parameter information included in the character information received from information processing apparatus A (such as an "experience parameter" which will be described later). The experience parameter represents one example of parameter information. Information processing apparatus B updates parameter information, for example, in response to a user's operation. Contents of update of the parameter information are changed, for example, in accordance with contents of the user's operation. More specifically, magnitude of a value by which parameter information is to be changed is determined in accordance with the contents of the user's operation.

Then, information processing apparatus B generates information for transmission ("Info" in FIG. 5) for transmitting updated character information to server 2 and causes the information to be stored in data for task transmission 143. In addition, information processing apparatus B generates and registers also a "transmission task" for transmitting "Info" to server 2 at appropriate timing. Consequently, a "transmission task" is executed at appropriate timing. Thus, "Info" is transmitted from information processing apparatus B to server 2. Server 2 accumulates "Info" transmitted from information processing apparatus B.

Then, passing communication takes place between information processing apparatus B and information processing apparatus C, so that the character information moves from transmission box for passing communication 144 of information processing apparatus B to reception box for passing communication 141 of information processing apparatus C. The character information moved here is character information updated in information processing apparatus B after it moved from information processing apparatus A to information processing apparatus B. Passing communication may take place before or after transmission of "Info" from information processing apparatus B to server 2.

Depending on contents of processing of the game application in information processing apparatus B, the character information may be moved (transferred) from information processing apparatus B to information processing apparatus C without change in value for parameter information. The character information being stored in reception box for passing communication 141 of information processing apparatus B and then moved to transmission box for passing communication 144 via a work area is herein referred to as "update". Namely, the parameter information may be updated without its value being changed.

In information processing apparatus C, when the game application is executed, the character information transmitted from information processing apparatus B is moved from reception box for passing communication 141 to a work area. When the character information includes "the number of times of movement," information processing apparatus C updates the character information such that a prescribed value is added to the "number of times of movement" with such movement.

Thereafter, in information processing apparatus C, after the character information is updated in accordance with the contents of processing of the game application, it is moved to transmission box for passing communication 144. Then, likewise information processing apparatus B, information processing apparatus C generates "Info" and a transmission task and transmits the character information to server 2. In addition, as a result of passing communication between information processing apparatus C and another information processing apparatus, the character information is transferred to another information processing apparatus.

Thus, the character information generated in information processing apparatus A is successively transferred to other information processing apparatuses through passing communication. In addition, information processing apparatuses B, C which have received the character information transmit "Info" to server 2 as appropriate. On the other hand, information processing apparatus A obtains "Log" accumulated in server 2. "Log" refers to Info corresponding to each information processing apparatus itself, of "Info" accumulated in server 2. Information processing apparatus A generates a "reception task" in order to obtain "Log" and receives "Log" at appropriate timing.

Information processing apparatus A can display how the character information generated and transmitted by information processing apparatus A has been changed through transfer, by making use of "Log".

[Outlines of Communication Between Apparatuses]

Figure 6:
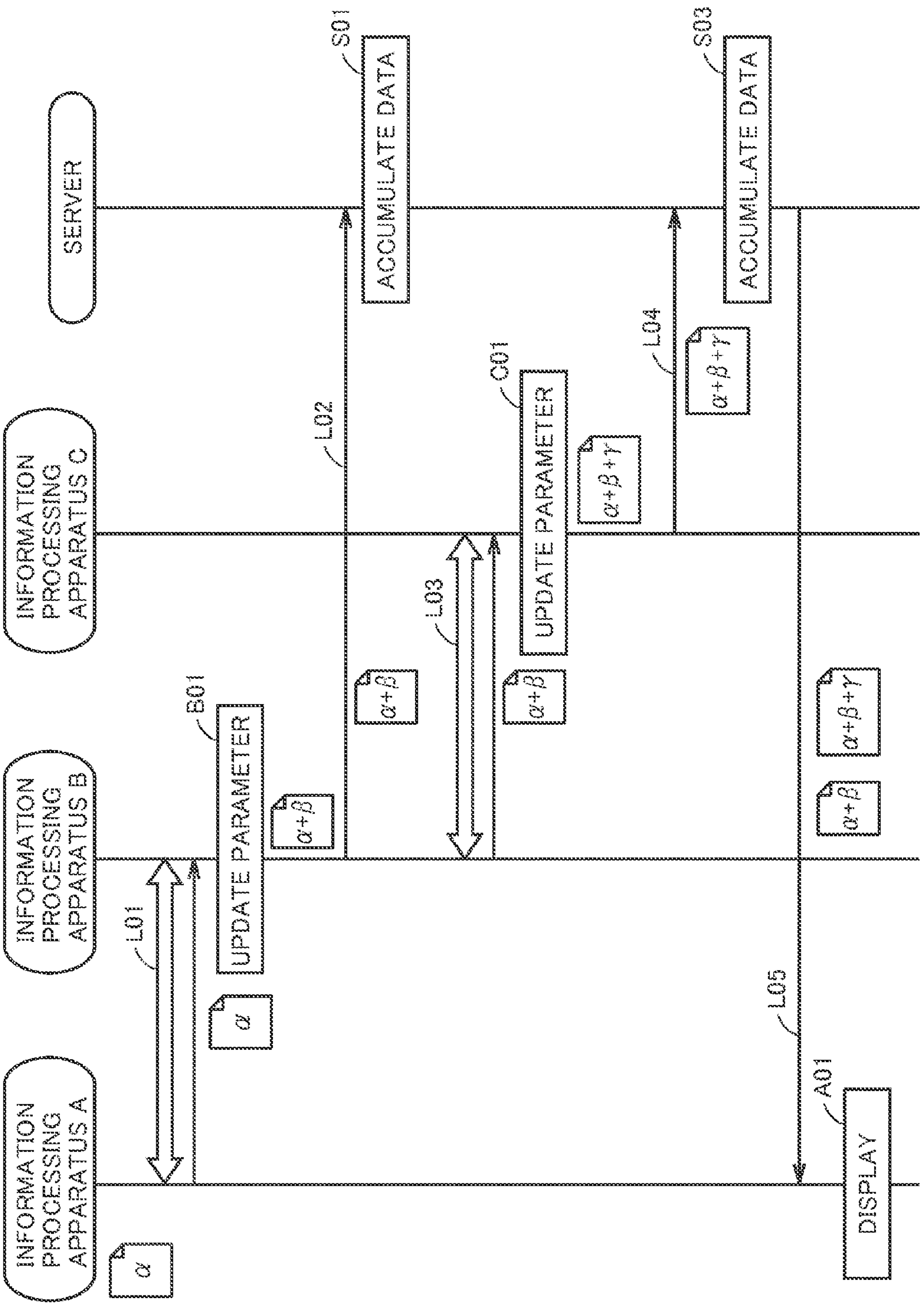
FIG. 6 shows an exemplary illustrative non-limiting timing chart of processing in each apparatus in the information system according to an exemplary embodiment.

Outlines of processing for communication between apparatuses in the information system will be described with reference to FIG. 6. FIG. 6 is a timing chart of processing in each apparatus in information system 1000. In FIG. 6, information processing apparatuses 1A to 1C are expressed as information processing apparatuses A to C, respectively.

Initially, as shown with an arrow L01 in FIG. 6, passing communication between information processing apparatus 1A and information processing apparatus 1B is carried out. Thus, character information is transmitted from information processing apparatus 1A to information processing apparatus 1B. A state of parameter information in the character information transmitted this time is a state generated in information processing apparatus 1A. "α" in FIG. 6 represents a state of parameter information at this time.

Then, in step B01, information processing apparatus 1B updates the parameter information in the character information transmitted from information processing apparatus 1A. In FIG. 6, a state of the parameter information after update in information processing apparatus 1B is represented by "α+β". FIG. 6 expresses update of the character information in information processing apparatus 1B as addition of "β" to the character information. Information processing apparatus 1B transmits the character information corresponding to "α+β" to server 2 through the Internet communication (an arrow L02). The character information is accumulated in server 2 (step S01).

Thereafter, as shown with an arrow L03 in FIG. 6, passing communication between information processing apparatus 1B and information processing apparatus 1C is carried out. Thus, the character information corresponding to "α+β" is transmitted from information processing apparatus 1B to information processing apparatus 1C.

Then, in step C01, information processing apparatus 1C updates the parameter information in the character information transmitted from information processing apparatus 1B. FIG. 6 shows a state of the parameter information after update in information processing apparatus 1C as "α+β+γ". FIG. 6 expresses update of the character information in information processing apparatus 1C by addition of "γ" to the character information. Information processing apparatus 1C transmits the character information corresponding to "α+β+γ" to server 2 through the Internet communication (an arrow L04). The character information is accumulated in server 2 (step S03).

The character information accumulated in server 2 is transmitted to information processing apparatus 1 in which the character information has been generated. In the example in FIG. 6, character information corresponding to each of "α+β" and "α+β+γ" is transmitted from server 2 to information processing apparatus 1A (an arrow L05).

In step A01, information processing apparatus 1A performs display processing making use of the received character information. In step A01, display making use of the character information represented by "α+β" and display making use of the character information represented by "α+β+γ" may separately be provided or display based on combination of such character information may be provided.

It is noted that, in a case where information processing apparatus 1B is disabled from communicating with server 2 or the like, the character information may be transmitted from information processing apparatus 1C to server 2 (arrow L04) before the character information is transmitted from information processing apparatus 1B to server 2 (arrow L02). Thus, in transmission of the character information from server 2 to information processing apparatus 1A (arrow L05), there may be a case where only the character information corresponding to "α+β+γ" is transmitted.

Thereafter, when information processing apparatus 1B is now able to communicate with server 2, the character information may be transmitted from information processing apparatus 1B to server 2 after the character information is transmitted from information processing apparatus 1C to server 2 (arrow L04). Thus, there may be a case where server 2 transmits to information processing apparatus 1A, the character information transmitted from information processing apparatus 1B after the character information transmitted from information processing apparatus 1C.

In the processing described with reference to FIG. 6, information processing apparatus 1A transmits only the character information generated in information processing apparatus 1A. It is noted that, likewise information processing apparatuses 1B, 1C, information processing apparatus 1A can also receive character information generated in another information processing apparatus 1 and can also transmit the received character information to another information processing apparatus 1. Thus, since character information generated in another information processing apparatus 1 can be transmitted, opportunities for data communication increase and zest of data communication can be enhanced.

Furthermore, in the processing described with reference to FIG. 6, information processing apparatus 1 (information processing apparatus 1B, information processing apparatus 1C) performs a set of processing consisting of update of the character information received from another information processing apparatus 1 and transmission of updated character information to yet another information processing apparatus 1. Then, each time information processing apparatus 1 performs the set of processing once, it transmits updated character information to server 2. It is noted that transmission of updated character information to server 2 may be withheld until the set of processing is performed a prescribed number of times. For example, information processing apparatus 1 may generate a transmission task for transmitting updated character information to server 2 on condition that the set of processing was performed twice.

[Processing for Communication Between Apparatuses]

Figure 14:
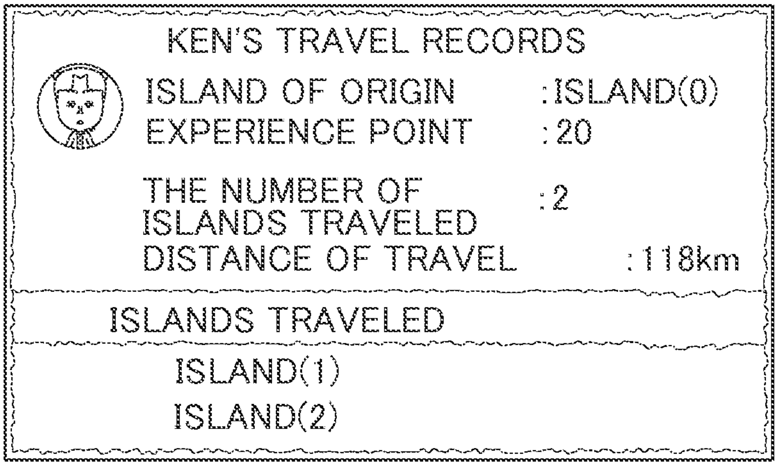
FIG. 14 shows an exemplary illustrative non-limiting screen of records according to an exemplary embodiment.
Figure 19:
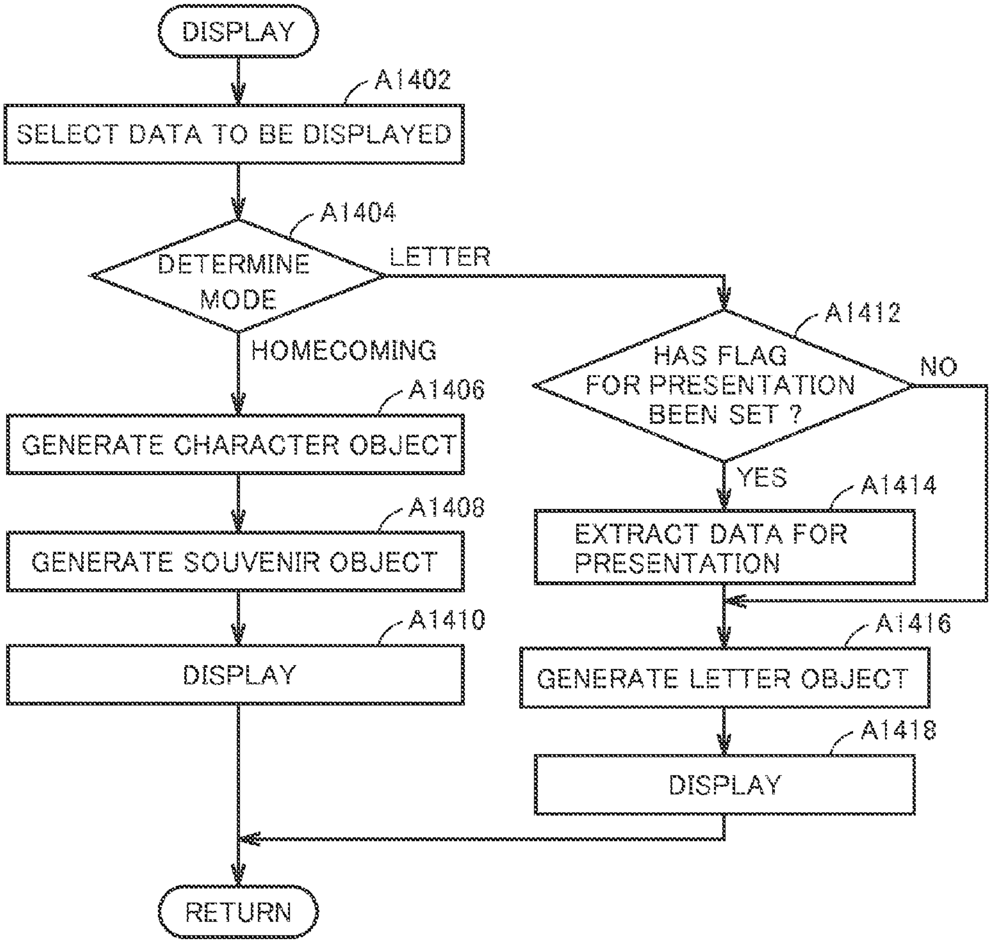
FIG. 19 shows an exemplary illustrative non-limiting flowchart of a sub routine of step A14 in FIG. 18 according to an exemplary embodiment.

Contents of processing for communication between apparatuses in information system 1000 will now be described more specifically with reference to FIGS. 7 to 19. FIGS. 7 to 13 are diagrams showing specific examples of character information. FIG. 14 is a diagram showing one example of a screen displayed based on the character information. FIGS. 15 to 18 are timing charts in the communication processing. FIG. 19 is a flowchart of a sub routine of step A14 in FIG. 18.

FIG. 7 shows a general configuration of character information. The character information includes basic information D10 and additional information D20A, D20B . . . Basic information D10 is a basic portion of the character information. Additional information D20A, D20B . . . is information added in information processing apparatus 1 which is a transfer destination of the character information. Additional information D20A, D20B . . . may also collectively be referred to as additional information D20.

Basic information D10 includes at least a character code, the number of times of movement, a terminal ID, an experience parameter, and a name of an island of origin. The character code refers to data specifying appearance in a case where a character corresponding to character information is displayed. For example, in a case where a character looks like a person, the character code is information specifying a color of eyes, a hairstyle, and the like. Information processing apparatus 1 can refer to information bringing a character code in correspondence with an object (such as a table). Thus, each information processing apparatus 1 can display an object corresponding to the character code (such as a character 50 which will be described later) if it obtains the character code. Information bringing a character code in correspondence with an object may be stored in internal storage device 14 or the like of each information processing apparatus 1 or may be stored in a storage device on a network accessible by processor 13. The information is common to information processing apparatuses 1 belonging to information system 1000.

The number of times of movement refers to information representing the number of times of transfer of character information. When parameter information in the character information is updated once, a value for the number of times of movement is updated by increment, for example, by “1”.

The terminal ID refers to identification information provided specifically for each information processing apparatus, and here, it refers to information specifying information processing apparatus 1 which has generated the character information.

The experience parameter refers to information of which value is changed in accordance with contents of processing in a game application in information processing apparatus 1. Depending on contents of processing in the game application, a value for an experience parameter may increase, decrease, or remain unchanged when the parameter information is updated.

Each information processing apparatus 1 stores, for example, a name of information processing apparatus 1 input by the user. A name of an island of origin is a name of information processing apparatus 1 which has generated the character information.

Each piece of additional information D20 includes at least a name of an island, souvenir data, a flag for presentation, and data for presentation. A name of an island is a name of information processing apparatus 1 which is a transfer destination. Souvenir data is data representing a “souvenir” made use of in processing which will be described later. A flag for presentation is a flag regarding presentation of specific contents. Data for presentation is data made use of for presentation. The flag for presentation and the data for presentation are information generated in accordance with contents of processing in the game application in information processing apparatus 1 which is a transfer destination.

For example, character information generated in information processing apparatus 1A includes only basic information D10. As a result of update in information processing apparatus 1B, additional information D20A is added to the character information. Thereafter, the character information is transferred to information processing apparatus 1C and updated in information processing apparatus 1C, so that additional information D20B is further added to the character information.

Figure 15:
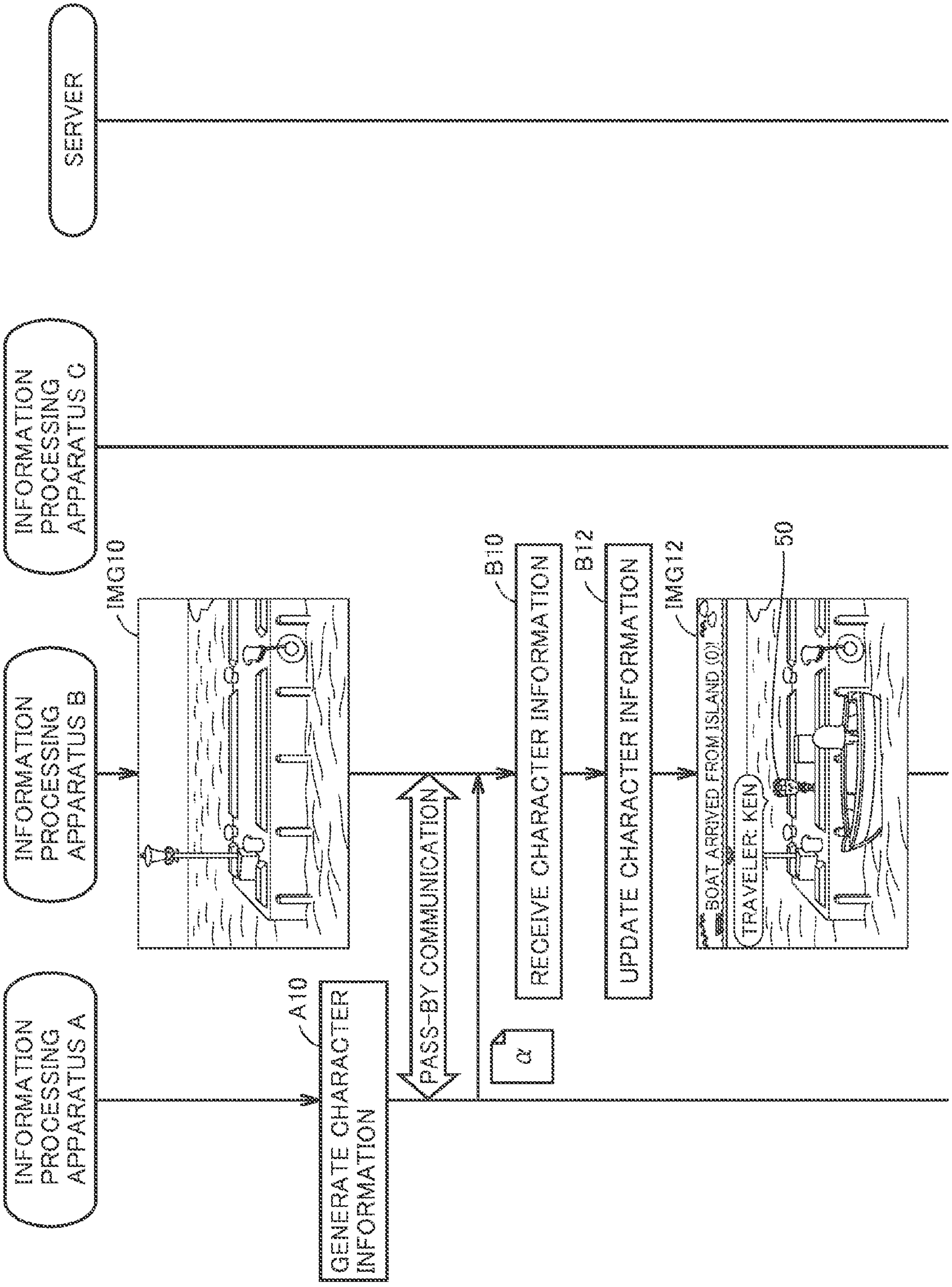
FIGS. 15 to 18 each show an exemplary illustrative non-limiting timing chart in communication processing according to an exemplary embodiment.

Referring to FIG. 15, in step A10, information processing apparatus 1A generates character information. FIG. 8 shows one example of the generated character information.

In the character information shown in FIG. 8, “CR0101” is set as one example of a value for a character code, “island (0)” is set as one example of a value for a name of an island of origin, “0” is set as one example of a value for the number of times of movement, “TA0123” is set as one example of a value for a terminal ID, and “0” is set as one example of a value for an experience parameter. The value for a terminal ID “TA0123” is a value specifying information processing apparatus 1A.

Then, information processing apparatus 1A transmits the character information to information processing apparatus 1B through passing communication with information processing apparatus 1B. In response thereto, information processing apparatus 1B receives the character information in step B10.

The game application of information processing apparatus 1B in FIG. 15 causes a screen, for example, as shown with a screen IMG10, to be displayed until information processing apparatus 1B receives character information from other information processing apparatuses 1 including information processing apparatus 1A. Screen IMG10 shows a dock where nobody is present, which represents one example of a display screen showing a stand-by state in the game application.

When information processing apparatus 1B receives the character information from information processing apparatus 1A (step B10), information processing apparatus 1B moves the character information received in step B10 from reception box for passing communication 141 to the work area.

Thereafter, information processing apparatus 1B updates the character information transmitted from information processing apparatus 1A in accordance with contents of processing by the game application (step B12). FIG. 9 shows one example of the updated character information. As compared with FIG. 8, a value for the number of times of movement of the character information in FIG. 9 has been incremented by 1 and additional information including an island name "island (1)" has been added to the character information. The additional information includes the island name "island (1)", souvenir data having a value "P", and a flag for presentation and data for presentation each having a value "NULL". The value "P" for the souvenir data indicates a souvenir of the island corresponding to information processing apparatus 1B (such as a specific type of food). The flag for presentation and the data for presentation will be described later.

Then, the game application of information processing apparatus 1B causes, for example, a screen IMG12 to be displayed. Screen IMG 12 shows a scene that character 50 who was put on board a boat from another island has arrived at the dock. Character 50 corresponds to the character code "CR0101" and a traveler named "Ken".

Figure 16:
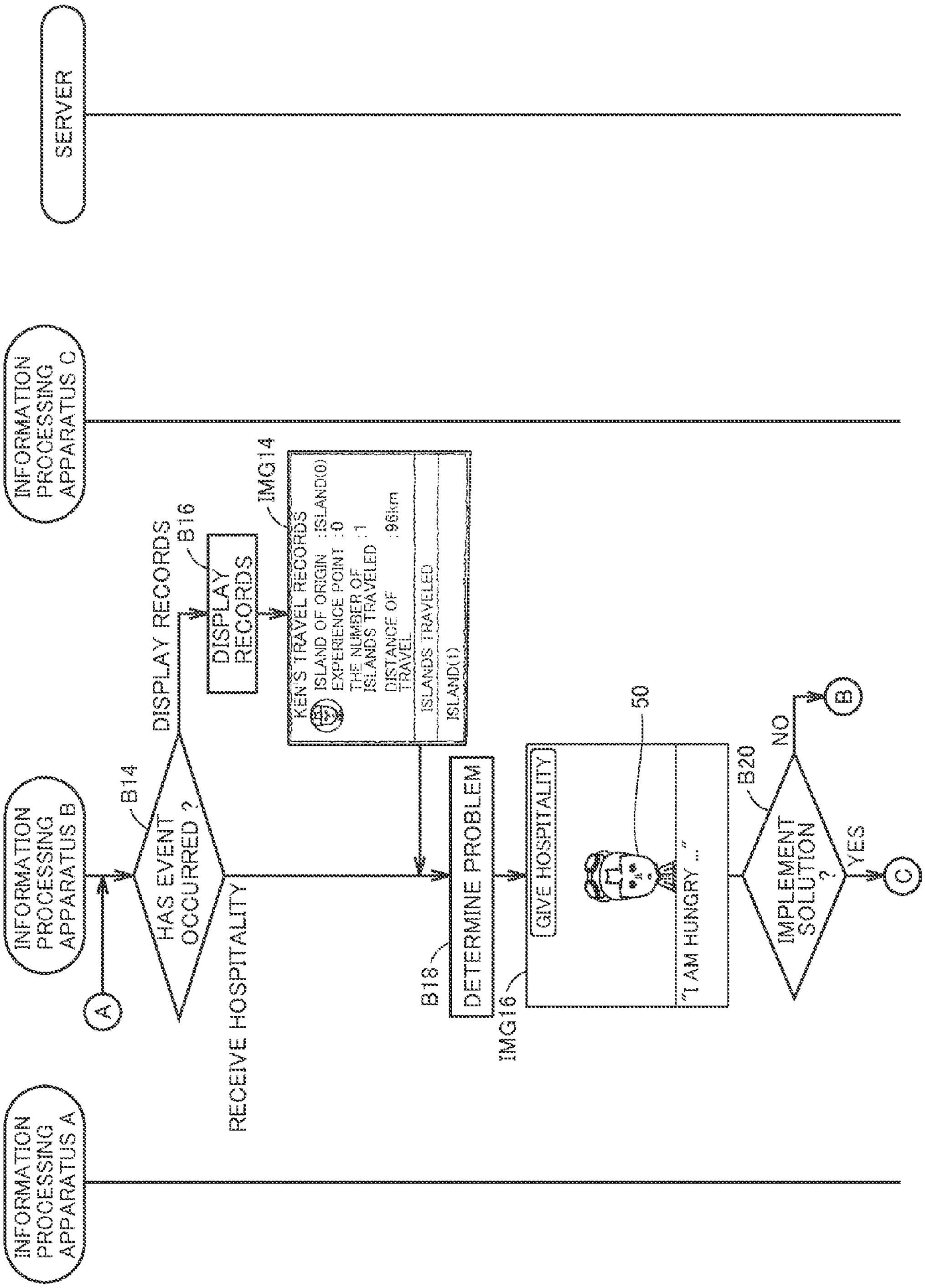

Referring to FIG. 16, in step B14, information processing apparatus 1B stands by until occurrence of an event "record display" or an event "receive hospitality". When the event "record display" occurs, control proceeds to step B16. When the event "receive hospitality" occurs, control proceeds to step B18. The event occurs, for example, based on a user's operation.

In step B16, information processing apparatus 1B displays records of a character in character information. A screen IMG14 represents one example of a screen showing records. Since received progress records of a character can be checked, zest of data communication can be enhanced. Screen IMG 14 includes, together with a title "Ken's travel records", an "island of origin" having a value "island (0)" and an "experience point" having a value "0". The "island of origin" is a name of an island of origin in the character information. The "experience point" is a value for an experience parameter of the character information. Names of information processing apparatuses 1A, 1B, 1C herein are defined as "island (0)", "island (1)", and "island (2)", respectively.

Screen IMG14 further includes "the number of islands traveled" having a value "1" and a "distance of travel" having a value "96 km". "The number of islands traveled" refers, for example, to the number of times of movement in the character information. The "distance of travel" refers, for example, to a length of a line connecting position information of each information processing apparatus 1 to which the character information has been transferred, in the order of transfer of the character information. In information system 1000, each information processing apparatus 1 may specify position information based on a name of an island of each information processing apparatus 1. In addition, character information may include information specifying position information of an island, separately from a name of each island (an island of origin or a name of an island in additional information). The position information may be information representing a location (such as a name of a prefecture) or may be represented by a plane coordinate. It is noted that a value for a distance of travel may be a product of a value for the number of times of movement and a given unit distance.

Screen IMG 14 further has a field of an "island traveled". The field displays "island (1)". The field displays a name of information processing apparatus 1 registered as an island name in "additional information".

In step B18, information processing apparatus 1B determines contents of a problem of a character which will be made use of for presentation, among contents registered in advance. Then, in step B18, information processing apparatus 1B provides such presentation display that the character confides a problem having determined contents, as shown in a screen IMG16. In screen IMG16, character 50 confides its problem of hunger.

Figure 17:
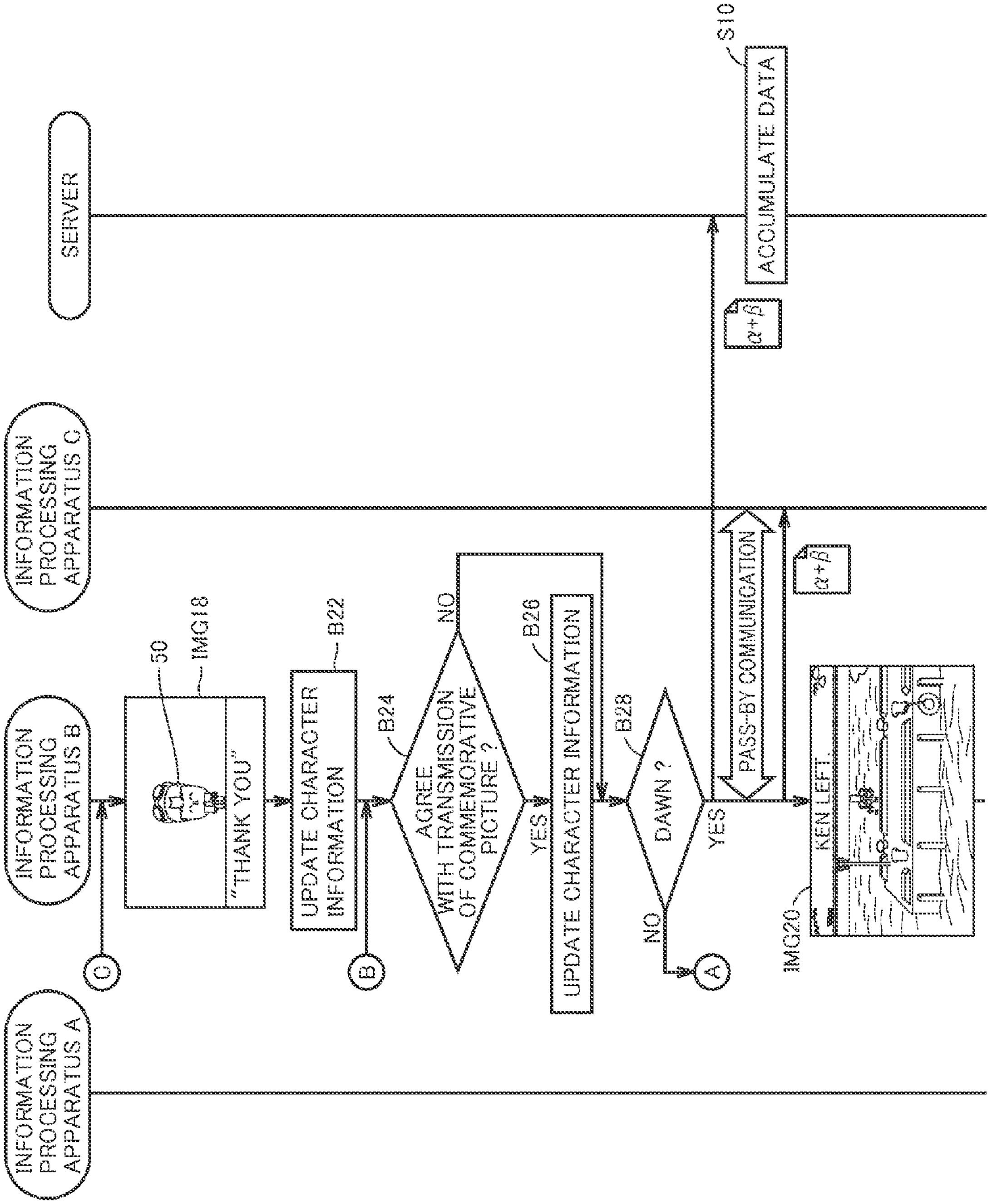
Figure 18:
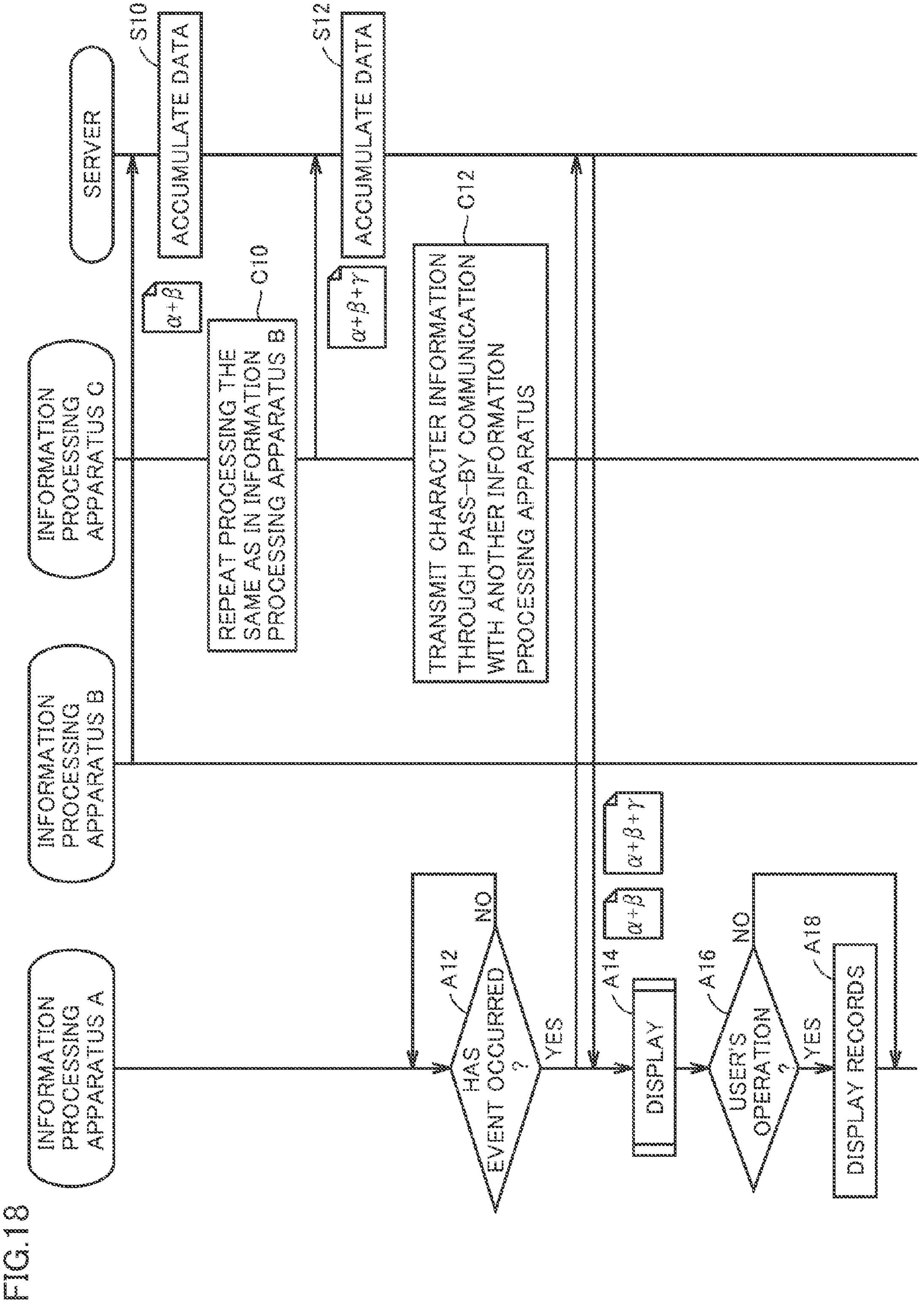

In step B20, information processing apparatus 1B determines whether or not an event which occurred subsequent to display in step B18 indicates implementation of a solution of the problem. When an event "to solve the problem" occurs, for example, a screen IMG18 (FIG. 17) is displayed and thereafter control proceeds to step B22 (FIG. 17). Screen IMG18 shows presentation display that food is given to the character in order to solve the problem of "hunger".

On the other hand, when an event "not to solve the problem" occurs, control proceeds from step B20 to step B24. The event "to solve the problem" and the event "not to solve the problem" both occur based, for example, on a user's operation.

In step B22, information processing apparatus 1B updates the character information. FIG. 10 shows one example of updated character information. As compared with FIG. 9, the character information shown in FIG. 10 has a value for the "experience parameter" incremented by "12". Thereafter, control proceeds to step B24. The "experience parameter" may be subtracted by updating.

In step B24, information processing apparatus 1B detects whether or not an operation indicating agreement with transmission of a commemorative picture has been performed. As the premise for step B24, for example, the game application in information processing apparatus 1B requests the user to perform an operation to input "whether or not he/she agrees with transmission of a commemorative picture." When an operation indicating agreement is performed, control proceeds to step B26, and when an operation indicating disagreement is performed, control proceeds to step B28.

In step B26, as shown in FIG. 11, values for the flag for presentation and the data for presentation are each updated and control proceeds to step B28. A value "1" is set as a value for the flag for presentation. For the value for the data for presentation, a character code of the character generated, for example, in information processing apparatus 1B (in the example in FIG. 11, a value "CR0121") is set.

In step B28, information processing apparatus 1B stands by from reception of character information in step B10 until dawn breaks. "Dawn breaks" means, for example, that the time kept by a timer has passed a specific time (for example, midnight). When dawn breaks, information processing apparatus 1B prepares for next passing communication. "Prepare" here includes movement of updated character information (FIG. 11) from the work area to transmission box for passing communication 144 and generation of a transmission task for transmission of the character information to server 2. Server 2 accumulates the received character information (step S10).

Thereafter, information processing apparatus 1B transmits the updated character information to information processing apparatus 1C as it carries out passing communication with information processing apparatus 1C. Here, the game application of information processing apparatus 1B causes, for example, a screen IMG20 to be displayed. Screen IMG20 shows a scene that character 50 which arrived at the island in screen IMG12 (FIG. 15) is put on board a boat and leaves the island.

It is noted that the game application may provide presentation display that character 50 is caused to stand at the dock after it determines that the dawn broke and until information processing apparatus 1B carries out passing communication with another information processing apparatus 1. This presentation display can encourage the user of information processing apparatus 1B to soon terminate such a state that character 50 stands alone at the dock, and thus the user can be invited to carry out passing communication of information processing apparatus 1B with another information processing apparatus 1.

In step C10, information processing apparatus 1C receives the character information from information processing apparatus 1B, and thereafter it performs processing (step B10 to step B28) the same as that performed by information processing apparatus 1B which received the character information from information processing apparatus 1A (step C10). The character information is updated also in information processing apparatus 1C as in information processing apparatus 1B. Then, information processing apparatus 1C transmits the updated character information to server 2, and in step C12, it transmits the updated character information to another information processing apparatus 1 through passing communication. In accordance with a state of communication in information processing apparatus 1C, information processing apparatus 1C may transmit the updated character information (see FIG. 13 which will be described later) to server 2 and thereafter transmit the same to another information processing apparatus 1, or vice versa. When server 2 receives the character information from information processing apparatus 1C, it accumulates the character information (step S12).

Update of character information in information processing apparatus 1C will be described with reference to FIGS. 11 to 13. Initially, the character information (FIG. 11) transmitted from information processing apparatus 1B has the number of times of movement incremented by "1" as shown in FIG. 12, and additional information "island (2)" is added to the character information. A value "TA0125N" for souvenir data in additional information expressed as island (2) is a value which is combination of a value "TA0125" representing information processing apparatus 1C and a value "N" representing position information of information processing apparatus 1C. Values for the flag for presentation and the data for presentation are each set to "NULL".

When solution of the problem is implemented in information processing apparatus 1C, a value for an experience parameter is incremented by 8 as shown in FIG. 13 and it has increased to "20".

Whether or not to update values for the flag for presentation and the data for presentation is determined based on contents of an operation as to whether or not to agree with transmission of a commemorative picture in the game application, as described as step B24. In the present embodiment, in information processing apparatus 1B, an operation indicating agreement with transmission of a commemorative picture has been performed. Therefore, in update of the character information in information processing apparatus 1B, values for the flag for presentation and the data for presentation have been changed. It is assumed that, in information processing apparatus 1C, an operation indicating disagreement with transmission of a commemorative picture has been performed. Thus, in the updated character information in information processing apparatus 1C, values for the flag for presentation and the data for presentation remain as NULL, as shown in FIG. 13.

On the other hand, information processing apparatus 1A stands by until an event of reception of character information accumulated in server 2 occurs in step A12. Then, when the event occurs in information processing apparatus 1A, information processing apparatus 1A requests server 2 to transmit the character information in information processing apparatus 1A. The request includes transmission, for example, of the terminal ID of information processing apparatus 1A itself and the time when the character information has previously been obtained from server 2 (the time of previous obtainment). In response, server 2 transmits the character information of information processing apparatus 1A (the character information in which a value for a terminal ID is the value "TA0123" representing information processing apparatus 1A) to information processing apparatus 1A.

Server 2 has accumulated the character information (FIG. 11) transmitted from information processing apparatus 1B and the character information (FIG. 13) transmitted from information processing apparatus 1C (steps S10, S12). Server 2 transmits to information processing apparatus 1A, the entire character information of information processing apparatus 1A, of the character information accumulated in server 2 after the time of previous obtainment, in response to the request from information processing apparatus 1A. Namely, the character information transmitted from information processing apparatus 1B and the character information transmitted from information processing apparatus 1C are transmitted to information processing apparatus 1A.

Then, in step A14, information processing apparatus 1A performs display processing with the use of the character information received from server 2. Contents of processing in step A14 will be described later with reference to FIGS. 19 to 25. The process proceeds to step A16. In step A16, information processing apparatus 1A stands by until a user's operation for displaying records of a character is performed. When the user's operation is performed, information processing apparatus 1A causes control to proceed to step A18. In step A18, information processing apparatus 1A displays records of a character. FIG. 14 shows one example of a screen of records displayed in step A18. When information processing apparatus 1A receives two or more pieces of character information from server 2, it makes use of character information greatest in the number of times of movement among them, to thereby create the screen in FIG. 14. More specifically, when FIG. 11 and FIG. 13 are compared with each other, the character information shown in FIG. 13 is greater in the number of times of movement. Therefore, information processing apparatus 1A makes use of the character information shown in FIG. 13 to thereby create the screen in FIG. 14.

The screen in FIG. 14 includes items similar to those in screen IMG14 in FIG. 16. It is noted that, referring to FIGS. 14 and 16, increase in value for an experience point by "20" in the screen in FIG. 14 is based on increase in value for the experience parameter by "12" in information processing apparatus 1B and increase by "8" in information processing apparatus 1C. The reason why the number of islands traveled increased by "1" in the screen in FIG. 14 is because the character information was transmitted to information processing apparatus 1B and thereafter it was further transmitted to information processing apparatus 1C. In the screen in FIG. 14, the distance of travel increased by 22 km as compared with screen IMG14 in FIG. 16. This distance is, for example, a distance from a position specified by position information of information processing apparatus 1B to a position specified by position information of information processing apparatus 1C.

In addition, in the screen in FIG. 14, "island (1)" and "island (2)" are exemplified as islands traveled. Moreover, in the screen in FIG. 14, a region to which each island belongs (position information) is also shown together. Namely, where the character information has moved can be identified based on records of a character and hence zest of data communication can be enhanced.

In the processing described above with reference to FIGS. 15 to 18, when information processing apparatus 1 receives character information from another information processing apparatus 1, it updates the number of times of movement in the character information and adds additional information to the character information. Furthermore, in information processing apparatus 1, there is a case that setting for refusing reception of information from specific information processing apparatus 1 can be made. In this case, even when information processing apparatus 1 receives character information from specific information processing apparatus 1, it does not update the number of times of movement nor add the character information.

[Display Processing (Step A14)]

FIG. 19 is a flowchart of a sub routine of step A14. Referring to FIG. 19, information processing apparatus 1A selects in step A1402, character information to be displayed and control proceeds to step A1404. More specifically, when information processing apparatus 1A receives two or more pieces of character information from server 2, it selects character information to be displayed from among the two or more pieces of character information under a given condition. The condition here is exemplified, for example, by character information most recent among the two or more pieces of character information.

In step A1404, information processing apparatus 1A determines a mode of display of character information. In the present embodiment, two types of display manners of "homecoming" and "letter" are prepared as display modes. When determination as a "homecoming" mode is made, control proceeds to step A1406. When determination as a "letter" mode is made, control proceeds to step A1412. In step A1404, information processing apparatus 1A selects one manner of presentation out of two manners of presentation, such that, for example, each time processing shown in FIG. 19 is performed, each of "homecoming" and "letter" is executed at a ratio set in advance. For example, in a case where a ratio of "homecoming" is set to 1/3 and a ratio of "letter" is set to "2/3", when the processing in FIG. 19 is performed 15 times, presentation of "homecoming" is selected approximately 5 times and presentation of "letter" is selected approximately 10 times.

It is noted that, in information processing apparatus 1A, a maximum value for the number of times of movement of the character information received so far may be stored. In such a case, when a value for the number of times of movement of the character information selected in step A1402 is smaller than the stored maximum value, the character information selected in step A1402 is not the character information updated in a most recent transfer destination. Therefore, in such a case, information processing apparatus 1A preferably selects in step A1404, "letter" as a display mode without exception. In step A1406, information processing apparatus 1A generates a character object (character 50) and control proceeds to step A1408. Character 50 is an object corresponding to a character code "CR0101".

A character object is generated mainly based on a value for a character code. It is noted that a character object may be changed in accordance with the number of times of movement. For example, a color of clothing worn by a character is changed in accordance with the number of times of movement. Thus, zest of passing communication (data communication) can be enhanced.

In the present embodiment, additional information (island (1), island (2), . . . ) added to character information in each information processing apparatus 1 makes up record information showing progress records, i.e., which information processing apparatus 1 has received character information. In addition, the number of times of movement constitutes record information similarly to additional information (island (1), island (2), . . . ). Then, a character object may be subject to change in color of clothing worn by the character in accordance with the number of pieces of record information instead of the number of times of movement (for example, the number of pieces of "souvenir data" in the character information).

In step A1408, information processing apparatus 1A generates a souvenir object and control proceeds to step A1410. The souvenir object refers, for example, to local specialties of a character's destination. A type of the souvenir object is determined based on souvenir data ("P" of island (1), "N" of island (2)) in the character information. When a plurality of pieces of souvenir data are included in the character information selected as an object to be displayed in step A1402, a souvenir object corresponding to partial souvenir data therein may be generated or souvenir objects corresponding to the entire souvenir data may be generated.

In step A1410, information processing apparatus 1A displays a screen generated by making use of the character object generated in step A1406 and the souvenir object generated in step A1408. Display contents in step A1410 will be described with reference to FIGS. 20 to 22.

Figure 20:
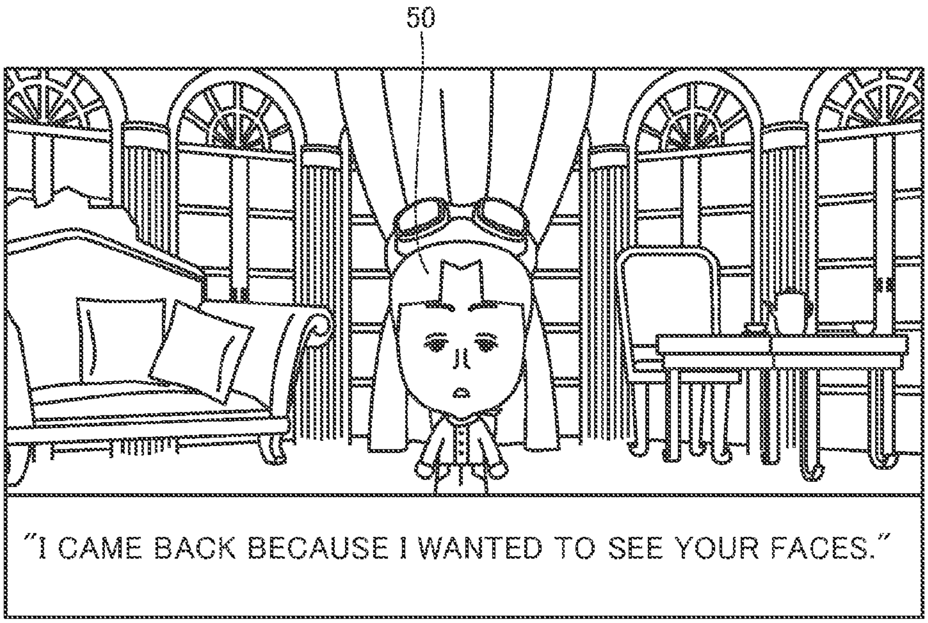
FIGS. 20 to 25 each show an exemplary illustrative non-limiting displayed image according to an exemplary embodiment.
Figure 21:
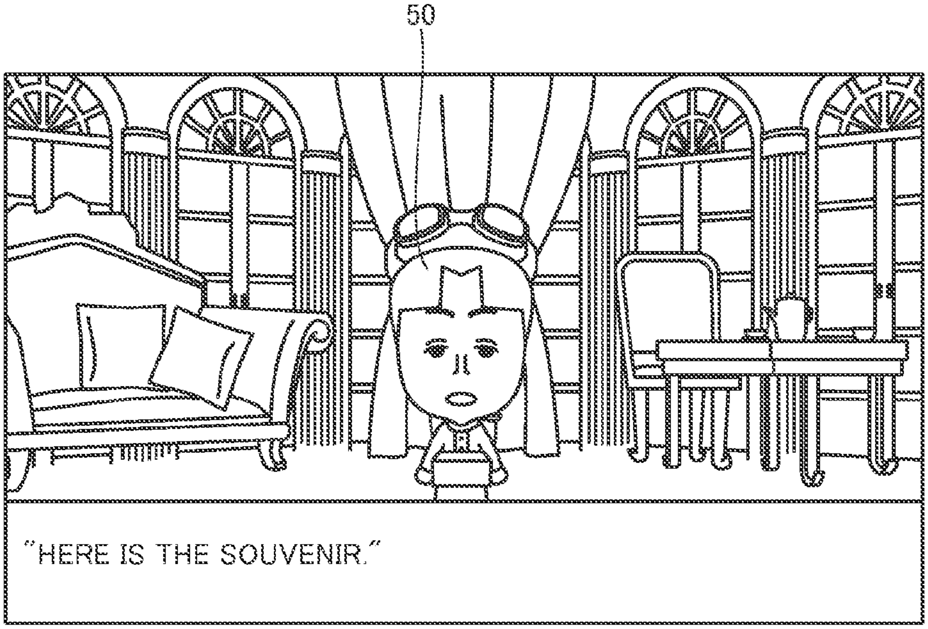
Figure 22:
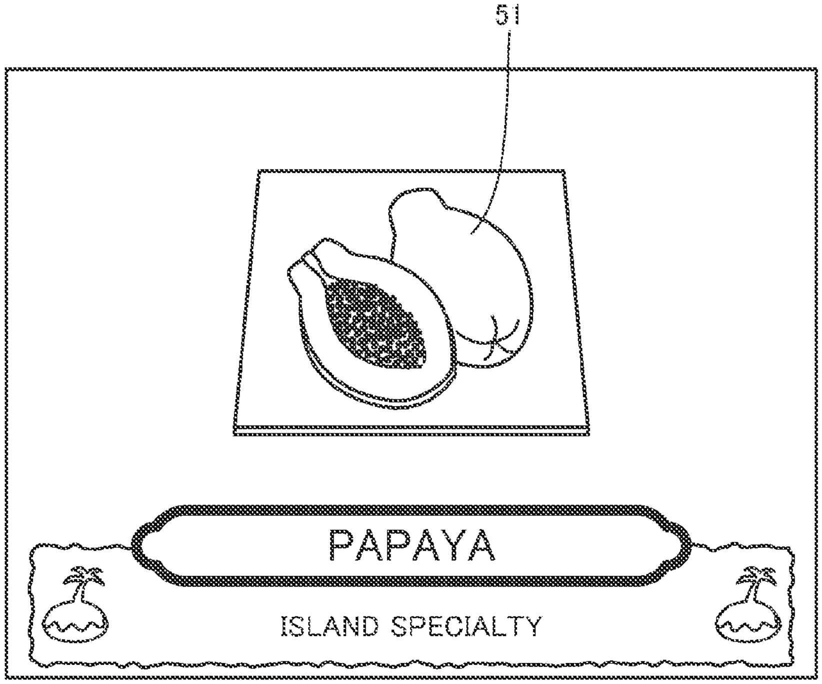

In step A1410, initially, a screen shown in FIG. 20 is displayed. The screen shown in FIG. 20 shows a scene that a traveler (character 50) tells a player (the user of information processing apparatus 1A) that he/she came back to his/her country (came home). This scene corresponds to the fact that the character corresponding to the character information generated in information processing apparatus 1A has returned to information processing apparatus 1A. Then, a screen shown in FIG. 21 is displayed. The screen shown in FIG. 21 shows a scene that character 50 hands a souvenir to the user. Then, a screen shown in FIG. 22 is displayed. The screen shown in FIG. 22 is a screen introducing a souvenir 51. Souvenir 51 in FIG. 22 is a souvenir object generated in step A1408. FIG. 22 shows a "papaya" by way of example of a souvenir.

Referring back to FIG. 19, in step A1412, information processing apparatus 1A determines whether or not a value "1" is set for at least one flag for presentation in the character information. When the value "1" is set for at least one flag for presentation, control proceeds to step A1414. When a value is not set for any flag for presentation (all NULL), control proceeds to step A1416.

In step A1414, data for presentation is extracted from the character information (FIG. 11 or FIG. 13) selected as an object to be displayed in step A1402 and control proceeds to step A1416.

In step A1416, information processing apparatus 1A generates a letter object and control proceeds to step A1418.

In step A1418, information processing apparatus 1A displays the letter object generated in step A1416.

Figure 23:
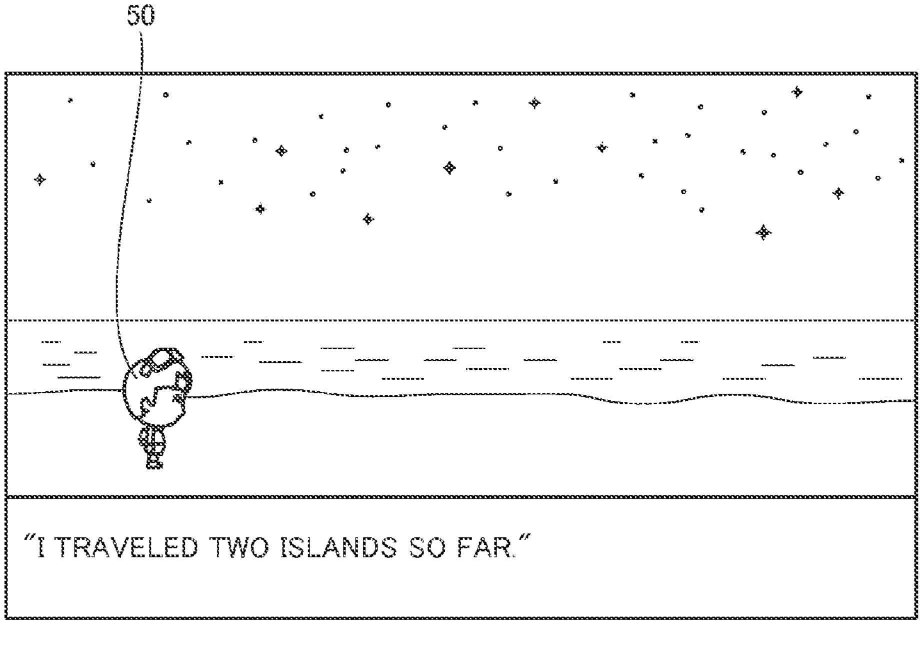

One example of a letter object displayed in step A1418 will be described with reference to FIGS. 23 to 25. The letter object includes two parts. FIG. 23 shows a first part. A screen in FIG. 23 shows a message that "I traveled two islands so far," together with a scene that character 50 reverts while he/she walks along the coast. The number of islands included in the message is, for example, equal to the number of times of movement of the character information.

Figure 24:
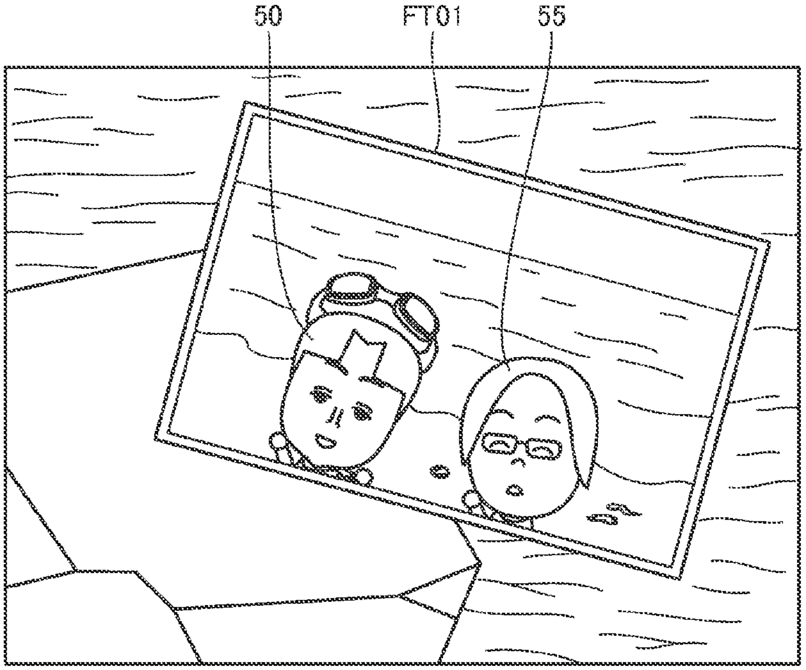

FIG. 24 shows one example of a second part and shows a scene that a photograph FT01 is taken out of an envelope. Photograph FT01 includes character 50 and a character 55. Character 50 corresponds to the character code "CR0101" generated in information processing apparatus 1A. Character 55 corresponds to data for presentation (a character code) extracted in step A1414. A letter displayed in this example includes a commemorative picture in which character 50 generated in information processing apparatus 1A is photographed together with character 55 generated in another information processing apparatus 1 (information processing apparatus 1B).

Figure 25:
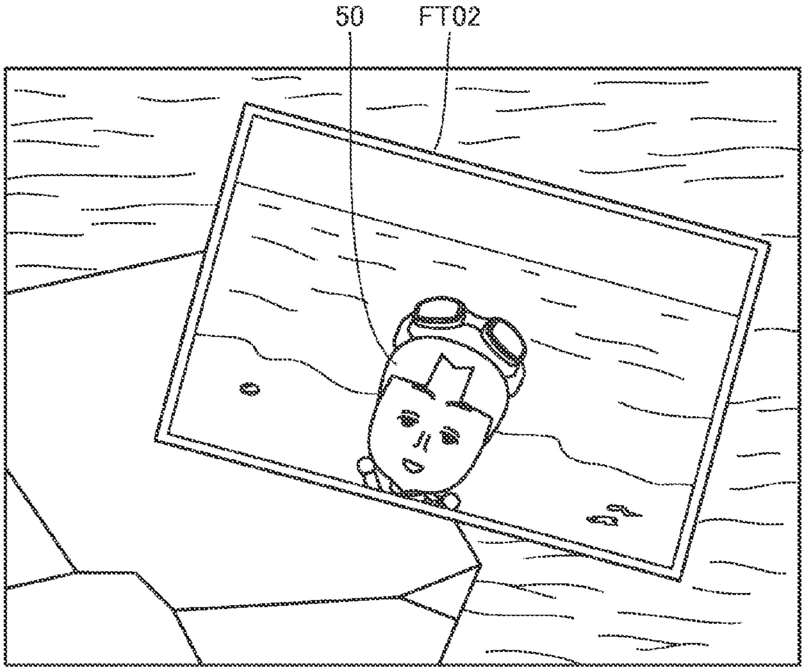

FIG. 25 shows another example of the second part and shows a scene that a photograph FT02 is taken out of an envelope. Photograph FT02 includes only character 50.

Whether or not a photograph displayed in the second part includes a character generated in another information processing apparatus 1 is determined based on a manner of update of character information in another information processing apparatus 1. More specifically, as described with reference to steps B24, B26 in FIG. 17, it is determined based on whether or not an operation indicating agreement with transmission of a commemorative picture has been performed in information processing apparatus 1 which is a transfer destination of the character information. When such an operation has been performed, a value "1" is set for a flag for presentation in the character information and the character information is updated such that data for presentation is added. When an operation indicating disagreement with transmission of a commemorative picture has been performed in information processing apparatus 1 which is a transfer destination of the character information, the character information is transmitted to server 2 and further to information processing apparatus 1A while values for the flag for presentation and the data for presentation each remain as "NULL".

In the present embodiment, character information includes a flag for presentation for each piece of additional information. It is noted that only one flag for presentation may be included commonly to every additional information. In this case, information processing apparatus 1 which is a transfer destination of character information sets a value for the common flag for presentation to 1 or NULL, depending on contents of an operation indicating agreement/disagreement with transmission of a commemorative picture. In step A1412, when a value for the common flag for presentation is set to 1, control proceeds to step A1414, and when it is set to NULL, control proceeds to step A1416.

In the present embodiment described above, each of the processing for "homecoming" described with reference to FIGS. 20 to 22 and the processing for "letter" described with reference to FIGS. 23 to 25 can be one example of display processing making use of an object. In the processing for "homecoming", position information such as "P" functions as display identification information specifying contents of a souvenir. In the processing for "letter", data for presentation of character information functions as display identification information specifying contents of a character photographed together with character 50 generated in information processing apparatus 1A.

In the present embodiment, an information processing apparatus can change character information received between apparatuses and thereafter transmit the resultant information to another information processing apparatus through passing communication. Then, the character information changed in another information processing apparatus can be received through a server and then displayed. Namely, since display processing based on parameter information changed in another information processing apparatus is performed in an information processing apparatus, zest of data communication can be enhanced.

Though an experience parameter in character information is changed in information processing apparatus 1 which is a transfer destination in the present embodiment, a character code may further be changed. For example, in a case where a game application performs processing for changing a color of hairs of a character in information processing apparatus 1 which is a transfer destination (travel destination), the character information is updated such that a value of a portion of the character code corresponding to the color of hairs of the character is changed.

It should be understood that the embodiment and a variation disclosed herein are illustrative and non-restrictive in every respect. The scope of the present embodiment is defined by the terms of the claims, rather than the description above, and is intended to include any modifications within the scope and meaning equivalent to the terms of the claims. It is intended that the techniques disclosed in the embodiment and the variation thereof can be practiced alone or in combination to the extent possible.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. An information system, comprising:

a plurality of information processing apparatuses, each said information processing apparatus being capable of communicating data with one another within a prescribed range; and a server capable of communicating data with each said information processing apparatus, each said information processing apparatus including:

a character information transceiver for transmitting to and receiving from another said information processing apparatus, character information having identification information identifying one or more said information processing apparatuses and parameter information which can be changed; and a processor system including at least one processor, the processor system being configured to change parameter information in the received character information;

transmit said changed character information to said server;

receive character information corresponding to identification information provided specifically for said each information processing apparatus itself from said server; and perform display processing based on the parameter information in the character information received from said server.

2. The information system according to claim 1, wherein said character information transceiver is configured to transmit at least one of first character information having the identification information of said each information processing apparatus itself and second character information having received identification information of another apparatus to said another information processing apparatus.

3. The information system according to claim 1, wherein the processor system of each said information processing apparatus is further configured to generate character information having parameter information which can be changed and identification information of the each information processing apparatus itself.

4. The information system according to claim 1, wherein said parameter information has record information showing progress records of an apparatus having received the parameter information, and the progress records of record information of the received character information is changed.

5. The information system according to claim 4, wherein each said information processing apparatus further includes its own record display for displaying record information included in the character information received from said server.

6. The information system according to claim 4, wherein each said information processing apparatus further includes another record display for displaying record information included in the character information exchanged between the apparatuses.

7. The information system according to claim 1, wherein the processor system of each said information processing apparatus is further configured to generate as additional information, display identification information associated with display processing based on said parameter information in another apparatus.

8. The information system according to claim 7, wherein said display processing is performed in accordance with the additional information included in the parameter information in the character information received from said server.

9. The information system according to claim 1, wherein the parameter information in the character information exchanged between said apparatuses is changed in response to a user's operation.

10. The information system according to claim 1, wherein the parameter information in received said character information is changed in response to reception between said apparatuses.

11. The information system according to claim 10, wherein said parameter information has record information showing progress records of an apparatus having received the parameter information, and said display processing is performed in a manner based on the record information included in said received character information.

12. The information system according to claim 1, wherein said display processing is performed making use of a character object generated based on the parameter information in the character information received from said server.

13. The information system according to claim 12, wherein one of a plurality of types of display processing is performed making use of the character object when a prescribed condition is satisfied.

14. The information system according to claim 13, wherein said display processing is performed for showing that said character object has returned to each information processing apparatus itself when said prescribed condition is satisfied.

15. A method for displaying information in an information system including a plurality of information processing apparatuses, each information processing apparatus being capable of communicating data with one another within a prescribed range and exchanging character information and parameter information with another information processing apparatus and a server capable of communicating data with each said information processing apparatus, said character information having identification information identifying one or more said information processing apparatuses and said parameter information being able to be changed, comprising:

receiving, by said information processing apparatus, said character information and said parameter information from said another information apparatus;

changing, by said another information processing apparatus, parameter information in the character information exchanged between the apparatuses;

transmitting, by said another information processing apparatus, the changed character information to said server;

receiving, by said information processing apparatus, character information corresponding to identification information provided specifically for said information processing apparatus itself from said server; and performing, by said information processing apparatus, display processing for displaying information based on the parameter information in the character information received from said server; wherein said display processing displays the character information corresponding to identification information of said information processing apparatus itself.

16. An information processing apparatus capable of communicating data with another information processing apparatus within a prescribed range and capable of communicating data with a server, comprising:

a character information transceiver for transmitting to and receiving from another information processing apparatus, character information having identification information identifying one or more information processing apparatuses and parameter information which can be changed;

a processor configured to change parameter information in the received character information;

a server transmitter for transmitting changed character information to said server;

a server receiver for receiving character information corresponding to identification information provided specifically for said information processing apparatus itself from said server; and a display controller for performing display processing based on the parameter information in the character information received from said server.

17. A non-transitory storage medium encoded with a computer readable program and executable by a computer, the computer being provided in an information processing apparatus capable of communicating data with another information processing apparatus present within a prescribed range and capable of communicating data with a server, said program causing said computer to perform the steps of:

transmitting to and receiving from another information processing apparatus, character information having identification information and parameter information which can be changed;

receiving character information transmitted from another information processing apparatus to said server and having changed parameter information corresponding to identification information provided specifically for said information processing apparatus itself from said server; and performing display processing for displaying information based on the parameter information in the character information received from said server.

* * * * *